United States Patent
Conner et al.

(10) Patent No.: US 9,290,399 B2
(45) Date of Patent: Mar. 22, 2016

(54) WASTEWATER TREATMENT PROCESS INCLUDING IRRADIATION OF PRIMARY SOLIDS

(71) Applicants: Saudi Arabian Oil Company, Dhahran (SA); SIEMENS ENERGY, INC., Orlando, FL (US)

(72) Inventors: William G. Conner, Spring, TX (US); Osama I. Fageeha, Dhahran (SA); Thomas E. Schultz, Waukesha, WI (US)

(73) Assignees: Saudi Arabian Oil Company, Dhahran (SA); Siemans Energy, Inc., Orlando, FL (US)

( * ) Notice: Subject to any disclaimer, the term of this patent is extended or adjusted under 35 U.S.C. 154(b) by 152 days.

(21) Appl. No.: 14/257,426

(22) Filed: Apr. 21, 2014

(65) Prior Publication Data
US 2014/0224730 A1   Aug. 14, 2014

Related U.S. Application Data

(60) Continuation of application No. 13/863,745, filed on Apr. 16, 2013, now Pat. No. 8,721,889, which is a division of application No. 12/832,723, filed on Jul. 8, 2010, now Pat. No. 8,440,074.

(60) Provisional application No. 61/224,016, filed on Jul. 8, 2009.

(51) Int. Cl.
*C02F 9/00* (2006.01)
*C02F 3/12* (2006.01)
(Continued)

(52) U.S. Cl.
CPC . *C02F 9/00* (2013.01); *B01D 21/02* (2013.01); *B01D 21/262* (2013.01);
(Continued)

(58) Field of Classification Search
None
See application file for complete search history.

(56) References Cited

U.S. PATENT DOCUMENTS 3,776,853 A   12/1973   Minter
3,803,029 A    4/1974   Blecharczyk
(Continued)

FOREIGN PATENT DOCUMENTS

CA   1240881 A1   8/1988
CN   86104726 A   2/1987
(Continued)

OTHER PUBLICATIONS

International Search Report and Written Opinion, PCT/US08/13987, Mar. 19, 2009.
(Continued)

*Primary Examiner* — Chester Barry
(74) *Attorney, Agent, or Firm* — Abelman, Frayne & Schwab

(57) ABSTRACT

The present invention provides a method for treating wastewater in which the majority of solids and biological oxygen demand compounds are separated from the wastewater feed using a primary separation process, to produce a solids phase and a water phase. The solids phase is irradiated to reduce the level of pathogens such that it is safe to use as a soil substitute and/or additive so that the solids can thus be disposed of in an environmentally-friendly manner. In additional embodiments, the solids that have been disinfected by radiation are mixed with a suitable inert filler material to produce a soil substitute, fertilizer, compost, or other soil additive. The liquid phase is treated in a substantially smaller system than would be required for treating the full-strength wastewater that can include a suspended media biological regeneration reactor system. The liquid treatment system can include a high flux adsorbent material treatment system integrated with a low flux adsorbent material biological regeneration reactor.

15 Claims, 7 Drawing Sheets

(51) Int. Cl.

| | | |
|---|---|---|
| *C05F 17/00* | (2006.01) | |
| *C02F 11/00* | (2006.01) | |
| *B01D 21/02* | (2006.01) | |
| *B01D 21/26* | (2006.01) | |
| *C02F 1/30* | (2006.01) | |
| *C02F 1/28* | (2006.01) | |
| *C02F 3/00* | (2006.01) | |
| *C02F 3/02* | (2006.01) | |
| *C02F 3/28* | (2006.01) | |
| *C02F 1/00* | (2006.01) | |

(52) U.S. Cl.
CPC .............. *B01D 21/267* (2013.01); *C02F 1/305* (2013.01); *C02F 1/307* (2013.01); *C02F 3/121* (2013.01); *C02F 3/1221* (2013.01); *C02F 3/1226* (2013.01); *C02F 3/1268* (2013.01); *C02F 11/00* (2013.01); *C05F 17/009* (2013.01); *C02F 1/281* (2013.01); *C02F 1/283* (2013.01); *C02F 1/288* (2013.01); *C02F 3/006* (2013.01); *C02F 3/02* (2013.01); *C02F 3/286* (2013.01); *C02F 3/2853* (2013.01); *C02F 2001/007* (2013.01); *C02F 2003/001* (2013.01); *C02F 2003/003* (2013.01); *C02F 2209/001* (2013.01); *C02F 2209/003* (2013.01); *C02F 2209/08* (2013.01); *C02F 2209/11* (2013.01); *C02F 2303/04* (2013.01); *C02F 2303/24* (2013.01); *Y02P 20/145* (2015.11); *Y02W 10/15* (2015.05); *Y02W 30/43* (2015.05)

(56) References Cited

U.S. PATENT DOCUMENTS

| | | | |
|---|---|---|---|
| 4,221,695 A | 9/1980 | Hino et al. | |
| 4,237,002 A | 12/1980 | Strudgeon et al. | |
| 4,265,747 A | 5/1981 | Copa et al. | |
| 4,371,454 A | 2/1983 | Hisatsugu et al. | |
| 4,495,056 A | 1/1985 | Venardos et al. | |
| 4,623,464 A | 11/1986 | Ying et al. | |
| 4,626,354 A | 12/1986 | Hoffman et al. | |
| 4,631,133 A | 12/1986 | Axelrod | |
| 4,656,153 A | 4/1987 | Wennerberg | |
| 4,749,492 A | 6/1988 | Berrigan, Jr. et al. | |
| 4,778,598 A | 10/1988 | Hoffman et al. | |
| 4,810,386 A | 3/1989 | Copa et al. | |
| 4,897,196 A | 1/1990 | Copa et al. | |
| 4,919,815 A | 4/1990 | Copa et al. | |
| 4,956,093 A | 9/1990 | Pirbazari et al. | |
| 5,068,036 A | 11/1991 | Li et al. | |
| 5,126,050 A | 6/1992 | Irvine et al. | |
| 5,192,442 A | 3/1993 | Piccirillo et al. | |
| 5,258,124 A | 11/1993 | Bolton et al. | |
| 5,302,288 A | 4/1994 | Meidl et al. | |
| 5,486,292 A | 1/1996 | Bair et al. | |
| 5,505,841 A | 4/1996 | Pirbazari et al. | |
| 5,560,819 A | 10/1996 | Taguchi | |
| 5,649,785 A | 7/1997 | Djerf et al. | |
| 5,653,883 A | 8/1997 | Newman et al. | |
| 5,932,099 A | 8/1999 | Cote et al. | |
| 5,972,211 A | 10/1999 | Jones | |
| 5,976,375 A | 11/1999 | Dorica et al. | |
| 6,030,529 A | 2/2000 | Biskner et al. | |
| 6,048,459 A | 4/2000 | Khudenko | |
| 6,077,424 A | 6/2000 | Katsukura et al. | |
| 6,132,600 A | 10/2000 | Marchesseault et al. | |
| 6,773,598 B2 | 8/2004 | Byers et al. | |
| 6,824,694 B2 | 11/2004 | Kicinski | |
| 6,863,818 B2 | 3/2005 | Daigger et al. | |
| 6,982,037 B2 | 1/2006 | Horng et al. | |
| 7,172,701 B2 | 2/2007 | Gaid et al. | |
| 7,329,344 B2 | 2/2008 | Jordan et al. | |
| 7,396,453 B1 | 7/2008 | Probst | |
| 7,645,390 B1 | 1/2010 | McClanahan | |
| 7,678,268 B2 | 3/2010 | Smith et al. | |
| 7,695,623 B2 | 4/2010 | Woodard et al. | |
| 7,790,034 B2 | 9/2010 | Peeters et al. | |
| 7,972,512 B2 | 7/2011 | Conner | |
| 8,123,944 B2 | 2/2012 | Haase et al. | |
| 8,440,074 B2 | 5/2013 | Conner et al. | |
| 8,449,773 B2 | 5/2013 | Hansen et al. | |
| 8,470,172 B2 | 6/2013 | Woodard et al. | |
| 8,551,341 B2 | 10/2013 | Conner et al. | |
| 8,557,111 B2 | 10/2013 | Conner et al. | |
| 8,721,889 B2 | 5/2014 | Conner et al. | |
| 9,073,764 B2 | 7/2015 | Conner et al. | |
| 2002/0189998 A1 | 12/2002 | Haase et al. | |
| 2003/0024884 A1 | 2/2003 | Petrik | |
| 2003/0132160 A1 | 7/2003 | Khudenko | |
| 2005/0252855 A1 | 11/2005 | Shieh et al. | |
| 2006/0175263 A1 | 8/2006 | Rice et al. | |
| 2006/0225574 A1 | 10/2006 | Braeunling et al. | |
| 2007/0021300 A1 | 1/2007 | Farant | |
| 2007/0114182 A1 | 5/2007 | Depoli et al. | |
| 2007/0122609 A1 | 5/2007 | Hiltzik et al. | |
| 2007/0123419 A1 | 5/2007 | Le bec | |
| 2007/0209999 A1 | 9/2007 | Smith et al. | |
| 2008/0047895 A1 | 2/2008 | Elefritz, Jr. et al. | |
| 2008/0110825 A1 | 5/2008 | Yamaguchi et al. | |
| 2008/0283469 A1 | 11/2008 | Pollock | |
| 2008/0314842 A1 | 12/2008 | Yaacov | |
| 2009/0039015 A1 | 2/2009 | Baba et al. | |
| 2009/0223894 A1 | 9/2009 | Muramoto et al. | |
| 2010/0133182 A1 | 6/2010 | Sun et al. | |

FOREIGN PATENT DOCUMENTS

| | | |
|---|---|---|
| CN | 1098815 C | 1/2003 |
| CN | 1454852 A | 11/2003 |
| CN | 1458092 A | 11/2003 |
| CN | 1490263 A | 4/2004 |
| CN | 1689994 A | 11/2005 |
| CN | 1792872 A | 6/2006 |
| CN | 1840483 A | 10/2006 |
| CN | 101054249 A | 10/2007 |
| CN | 2009643668 Y | 10/2007 |
| CN | 101223109 A | 7/2008 |
| DE | 4231628 C1 | 2/1994 |
| DE | 10337550 A1 | 3/2005 |
| EP | 543579 A1 | 5/1993 |
| EP | 1258460 A2 | 11/2002 |
| GB | 1200366 | 7/1970 |
| GB | 1296233 | 11/1972 |
| GB | 1487789 | 10/1977 |
| GB | 1579623 | 11/1980 |
| JP | 5022350 B | 7/1975 |
| JP | 58110412 A | 7/1983 |
| JP | S62286591 | 12/1987 |
| JP | 63020097 A | 1/1988 |
| JP | S6316096 | 1/1988 |
| JP | H0994600 A | 4/1997 |
| JP | 10323683 A | 12/1998 |
| JP | H11042497 A | 2/1999 |
| JP | 11244884 A | 9/1999 |
| JP | 2000308895 A | 11/2000 |
| JP | 2002320961 A | 11/2002 |
| JP | 2003261314 A | 9/2003 |
| JP | 2005231942 A | 9/2005 |
| JP | 2006122865 A | 5/2006 |
| KR | 100302469 B1 | 7/2001 |
| KR | 20010096080 A | 11/2001 |
| KR | 2005048447 A | 5/2005 |
| KR | 2008112652 A | 12/2008 |
| RU | 74122 U1 | 6/2008 |
| RU | 2351551 C1 | 4/2009 |
| WO | 9010602 A1 | 9/1990 |
| WO | 9519322 A1 | 7/1995 |
| WO | 9521794 A1 | 8/1995 |
| WO | 9637444 A1 | 11/1996 |
| WO | 3062153 A1 | 7/2003 |

(56) References Cited

FOREIGN PATENT DOCUMENTS

| WO | 2006053402 A1 | 5/2006 |
| WO | 2007062216 A2 | 5/2007 |

OTHER PUBLICATIONS

International Preliminary Report on Patentability, PCT/US08/13987, Jun. 18, 2010.
International Search Report and Written Opinion,PCT/US 10/38644, Aug. 11, 2010.
International Search Report and Written Opinion, PCT/US 10/38650, Aug. 23, 2010.
International Search Report and Written Opinion, PCT/US 10/41317, Sep. 1, 2010.
International Search Report and Written Opinion, PCT/US 10/41322, Sep. 1, 2010.
International Search Report and Written Opinion, PCT/US07/05775, Jul. 15, 2008.
"PACT Systems: Cleaning up Industrial Wastewater in One Step," Siemens, Water Technologies, 301 West Military Road, Rothschild, WI 54474, 2006, 6 pages.
Thuy, Q.T.T. (2003) Removal of inhibitory phenolic compounds by membrane bioreactor. Master's Thesis. Asian Institute of Technology, Thailand, 8 pages.
DynaSand, PDynaSand Filter Continuous Filtration Process, Parkson, 2009, 4 pages.
Chinese Patent Application No. 200880127140.8, Office Action dated Dec. 16, 2011.
NSF Product and Service Listing, "Picasprb 16," http://www/nsf.org/Certified/PwsComponents/listings.asp?standard=061&company=57090& (undated) (downloaded Sep. 26, 2011).
Chinese Patent Application No. 201080030782.3, Office Action dated Jan. 31, 2013.
Chinese Patent Application No. 201080030782.3, Office Action dated Sep. 16, 2013.
Chen Heqian et al. "Research on the feasibility of zeolite coupled contact-stabilization activated sludge process," Techniques and Equipment for Environmental Pollution Control, vol. 6, No. 8., Aug. 2005, pp. 26-29 (English language Abstract).
A.D. Smimov, Sorption Water Cleaning, Moscow, "Khimiay" Publishing House, 1982.
A.M. Kaganovsky et al., Purification and use of wastewaters in an industrial water supply, Moscow, "Khimiay" Publishing House, 1983.
Office Action dated Apr. 18, 2013 in Chinese Patent Application 201080030092.8.
Office Action dated Feb. 25, 2013 in Eurasian Patent Application 201200104.
Office Action dated Jul. 9, 2013 in Eurasian Patent Application 201200104.
Office Action dated Feb. 4, 2015 in Eurasian Patent Application 201300643.
Notification of Reason for Refusal, Japanese Patent Application No. 2012-519715, Feb. 3, 2015, 19 Pages.
Notification of Reason for Refusal, Japanese Patent Application No. 2012-519715, Jan. 17, 2014, 12 Pages.
EP20100797827.2, European Office Action, Sep. 19, 2014, pp. 1-6.
EP20100797827.2, Supplementary Search Report, Dec. 10, 2013, pp. 1-7.

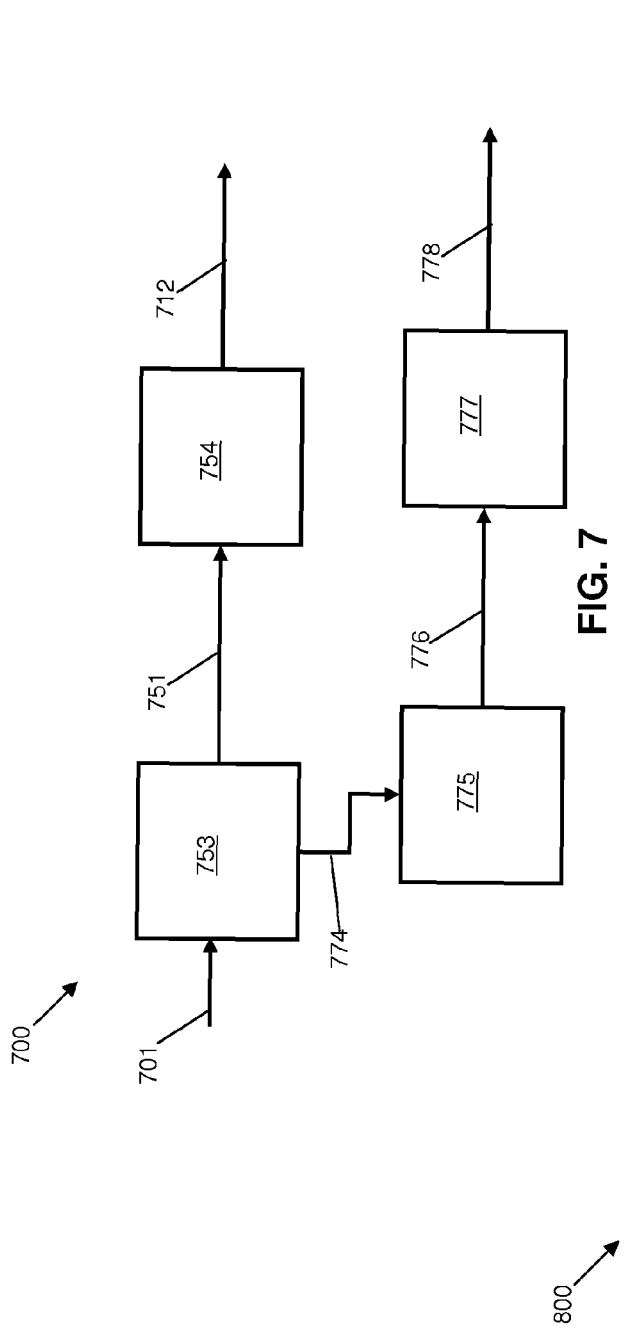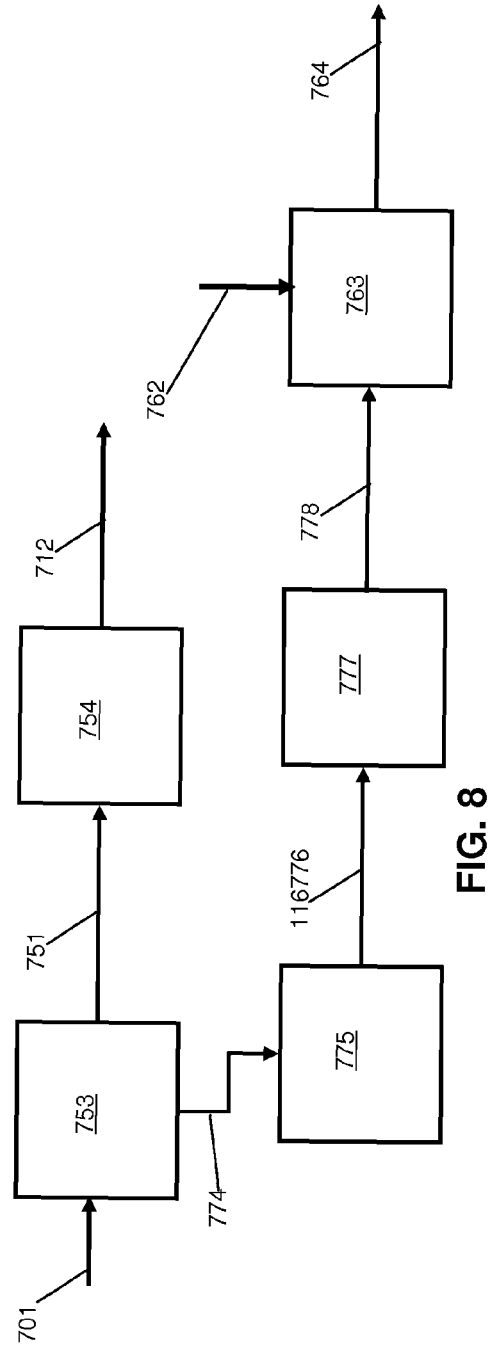

WASTEWATER TREATMENT PROCESS INCLUDING IRRADIATION OF PRIMARY SOLIDS

RELATED APPLICATIONS

This application is a continuation application of U.S. patent application Ser. No. 13/863,745 filed on Apr. 16, 2013, now U.S. Pat. No. 8,721,889, which is a divisional application of U.S. patent application Ser. No. 12/832,723 filed on Jul. 8, 2010, now U.S. Pat. No. 8,440,074, which claims the benefit of U.S. Provisional Patent Application No. 61/224,016 filed on Jul. 8, 2009, which are all hereby incorporated by reference in their entireties.

BACKGROUND OF THE INVENTION

1. Field of the Invention

This invention relates to a system and method for wastewater treatment.

2. Description of Related Art

Effective handling of domestic sewage and industrial wastewater is an extremely important aspect of increasing the quality of life and conservation of clean water. The problems associated with simply discharging wastewater in water sources such as rivers, lakes and oceans, the standard practice up until about a half century ago, are apparent—the biological and chemical wastes create hazards to all life forms including the spread of infectious diseases and exposure to carcinogenic chemicals. Therefore, wastewater treatment processes have evolved into systems ranging from the ubiquitous municipal wastewater treatment facilities, where sanitary wastewater from domestic populations is cleaned, to specialized industrial wastewater treatment processes, where specific pollutants in wastewater from various industrial applications must be addressed.

Wastewater treatment facilities typically use multiple treatment stages including preliminary treatment, secondary treatment and tertiary treatment. Biological oxidation is a well known secondary treatment step used to remove the majority of the wastewater contaminants. Commonly, effluent from biological oxidation and/or other secondary treatment processes still contains levels of contaminants that requires further treatment such as tertiary treatment for their removal.

Biologically refractory and biologically inhibitory organic and inorganic compounds are present in certain industrial and sanitary wastewater streams to be treated. Various attempts have been made to address treatment of such biologically refractory and biologically inhibitory compounds. Certain types of known treatment include use of powdered activated carbon to adsorb and subsequently remove biologically refractory and biologically inhibitory organic compounds.

One portion of certain wastewater treatment processes that is operationally cost-intensive involves the removal of relatively low concentrations of contaminants from wastewater that has been treated by aeration or other secondary processes. While various systems have been employed for tertiary treatment, such as adsorption and filters, a need exists for more efficient and lower cost tertiary treatment without the limitations and disadvantages associated with conventional processes.

SUMMARY OF THE INVENTION

In accordance with one or more embodiments, the invention relates to a system and method of treating wastewater. The present invention provides a system and method for treating wastewater in which the majority of solids and biological oxygen demand compounds are separated from the wastewater feed using a primary separation process, to produce a solids phase and a water phase. The solids phase is irradiated to reduce the level of pathogens such that it is safe to use as a soil substitute and/or additive so that the solids can thus be disposed of in an environmentally-friendly manner. In additional embodiments, the solids that have been disinfected by radiation are mixed with a suitable inert filler material to produce a soil substitute, fertilizer, compost, or other soil additive. The liquid phase is treated in a substantially smaller system than would be required for treating the full-strength wastewater that can include a suspended media biological reactor system. The liquid treatment system according to the present invention includes a high flux adsorbent material treatment system integrated with a low flux adsorbent material biological regeneration reactor.

In accordance with one or more embodiments, the invention relates to method for treating wastewater that contains solids and biological oxygen demand compounds. The process comprises:

separating a majority of the solids and biological oxygen demand compounds from the wastewater feed using a primary separation process to provide a solids phase and a water phase including wastewater, and in certain embodiments low concentration wastewater, the solids phase containing an initial level of pathogens;

irradiating the solids phase to reduce the level of pathogens;

mixing the wastewater with adsorbent material in a mixing zone for a time sufficient for adsorption of contaminants from the wastewater on the adsorbent material;

separating and removing a major portion of the wastewater from the mixture of wastewater and adsorbent material;

passing the adsorbent material having contaminants adsorbed thereon and a minor portion of the wastewater to a biological regeneration reactor;

retaining the adsorbent material and wastewater in suspension in the biological regeneration reactor for a period of time that is sufficient to allow microorganisms in the biological regeneration reactor to biologically act on at least a portion of the adsorbed contaminants;

discharging biologically treated water effluent from the biological regeneration reactor; and recycling regenerated adsorbent material to the mixing zone.

In accordance with one or more embodiments, the invention relates to a system for treatment wastewater. The system includes a radiation treatment zone having a source of radiation, an inlet for receiving primary solids, a solids outlet for discharging irradiated primary solids and a wastewater outlet. The system also includes a mixing zone having a wastewater inlet in communication with the wastewater outlet of the radiation treatment zone, an adsorbent material inlet and a discharge outlet. The system further includes an adsorbent material settling and liquid separation zone having a slurry inlet in communication with the discharge outlet of the mixing zone, a treated water outlet, and a contaminated adsorbent material outlet. The system also includes an adsorbent material biological regeneration reactor system having a biological regeneration reactor including a contaminated adsorbent material inlet in communication with the contaminated adsorbent material outlet of the adsorbent material settling and liquid separation zone, a biologically treated water outlet, and a regenerated adsorbent material outlet in communication with the adsorbent material inlet of the mixing zone.

In accordance with one or more embodiments, the invention relates to a system for treatment wastewater. The system includes a radiation treatment zone having a source of radiation, an inlet for receiving primary solids, a solids outlet for discharging irradiated primary solids and a wastewater outlet. The system further includes a high flux adsorption system and a low flux biological adsorption system. The high flux adsorption system includes an inlet in fluid communication with the wastewater outlet of the radiation treatment zone, a source of adsorbent material for contacting the wastewater and adsorbing contaminants from the wastewater, a liquid outlet for discharging a major portion of the received wastewater that has been contacted by the adsorbent material, and an adsorbent material outlet for discharging adsorbent material having adsorbed contaminants and a minor portion of the received wastewater. The low flux biological adsorption system is for maintaining the adsorbent material having adsorbed contaminants in suspension for a period of time that is sufficient to allow microorganisms to digest adsorbed organic contaminants. The low flux biological adsorption system includes a biological regeneration reactor having an inlet for receiving adsorbent material with adsorbed contaminants from the adsorbent material outlet of the high flux adsorption system, a mixed liquor outlet, and an adsorbent material outlet in communication with the source of adsorbent material of the high flux adsorption system.

BRIEF DESCRIPTION OF THE DRAWINGS

The invention will be described in further detail below and with reference to the attached drawings all of which describe or relate to apparatus, systems and methods of the present invention. In the figures, which are not intended to be drawn to scale, each similar component that is illustrated in various figures is represented by a like numeral. In the figures:

FIG. 7 is a schematic diagram of a process flow for treating wastewater according to one embodiment of the present invention including irradiation of primary solids; and FIG. 8 is a schematic diagram of a process flow for treating wastewater according to another embodiment of the present invention including irradiation of primary solids.

DETAILED DESCRIPTION OF THE INVENTION

Figure 1:
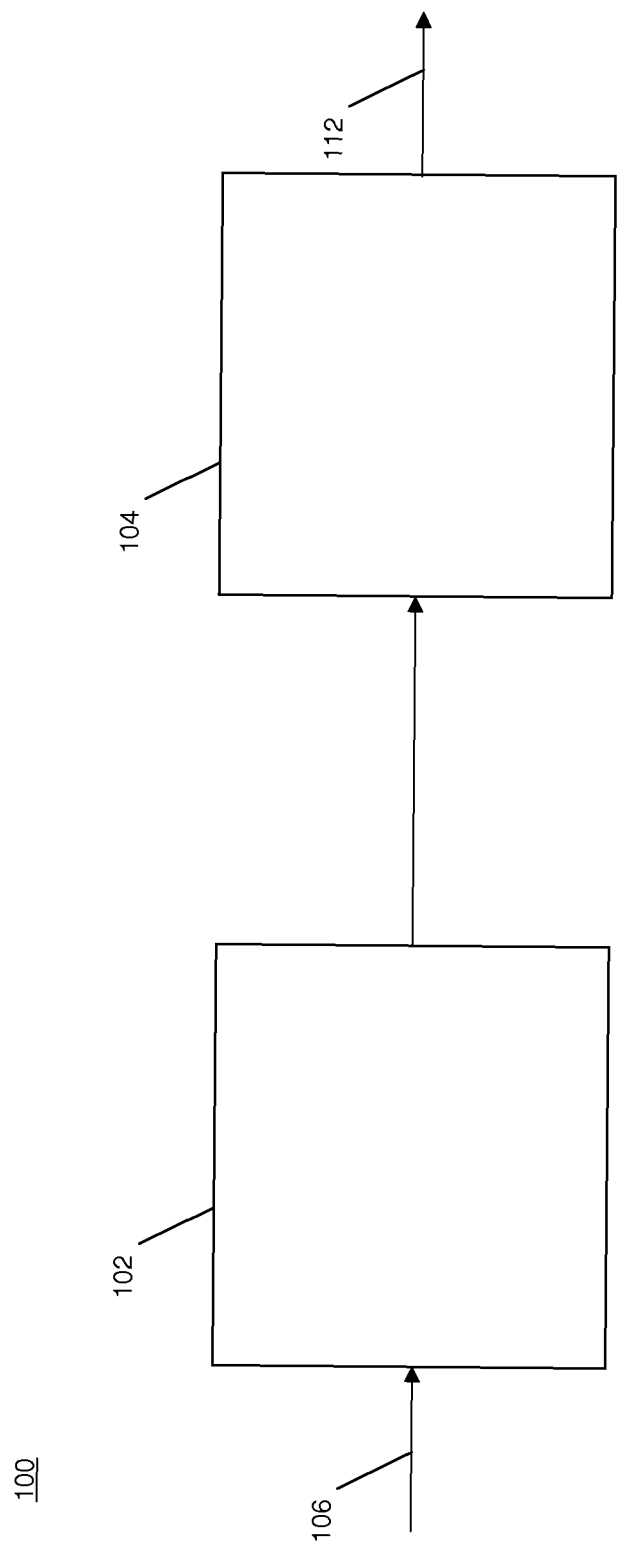
FIG. 1 is a schematic diagram of a membrane biological reactor system using a biological reactor which contains one or more zones with adsorbent material in suspension.

As used herein, "biologically refractory compounds" refer to those types of chemical oxygen demand ("COD") compounds (organic and/or inorganic) in wastewater that are difficult to biologically break down when contacted with microorganisms. The "biologically refractory compounds" can have varying degrees of refractory nature, ranging from those that are mildly refractory to those that are highly refractory.

"Biologically inhibitory compounds" refer to those compounds (organic and/or inorganic) in wastewater that inhibit the biological decomposition process.

"Biologically labile" means easy-to-digest, simple organics such as human and animal waste, food waste, and inorganics, such as ammonia and phosphorous-based compounds.

"COD" or "Chemical Oxygen Demand," refers to a measure of the capacity of the waste to consume oxygen during a chemical reaction that results in the oxidation of organic matter and the oxidation of inorganic chemicals such as ammonia and nitrite. COD measurement includes biologically labile, biologically inhibitory and biologically refractory compounds.

"$BOD_5$" refers to biological oxygen demand compounds that are biologically degradable over a period of 5 days.

"Mixed liquor suspended solids," or "MLSS," means microbes and other substances, both dissolved and suspended, present in wastewater being treated; "mixed liquor volatile suspended solids," or "MLVSS," means the active microbes in the MLSS; and "mixed liquor" means the combined mixture of wastewater, MLSS and MLVSS.

"Adsorbent" or "adsorbent materials" as used herein means one or more of granular activated carbon, including granular activated carbon that has been treated to provide affinity to predetermined chemical species, metals or other compounds found to be present in the wastewater that is to be treated; granular iron-based compounds, e.g., iron oxide composites; synthetic resins; and granular alumino-silicate composites.

"Substantially free" or "substantially prevented" in the context of describing the presence of adsorbent material in effluent passing from one section of a system to another, e.g., from a biological reactor containing suspended adsorbent material to a membrane operating system, refers to limiting the amount of adsorbent material passing to the membrane operating system to an amount that does not adversely effect the requisite efficacy of the membrane filtration process therein. For instance, in certain embodiments, "substantially free" or "substantially prevented" refers to retaining at least about 80% by volume of the predetermined amount of adsorbent material to be used in a given system within the biological reactor or one or more biological reaction zones, in further embodiments, at least about 90% by volume and in still further embodiments at least about 95% by volume, and in yet still further embodiments at least about 99% by volume. However, it will be appreciated by one of ordinary skill in the art based upon the teachings herein that these percentages are merely illustrative, and can vary depending on factors including but not limited to the type of membrane(s) used and their resistance to abrasion, the requisite effluent quality, the predetermined amount of adsorbent material to be used in a given system, and other factors.

This invention is directed to wastewater treatment systems and methods. "Wastewater" as used herein, for instance, as influent streams 101, 201, 301, 401, 501, 601 or 701, defines any water to be treated such as surface water, ground water, and a stream of wastewater from industrial, agricultural and municipal sources, having pollutants of biodegradable material, inorganic, labile organic compounds capable of being decomposed by bacteria, biologically refractory compounds, and/or biologically inhibitory compounds, flowing into the wastewater treatment system.

Wastewater from industrial and municipal sources typically contains biological solids, and inert material and organics, including biologically inhibitory and refractory organics. Examples of biologically inhibitory and refractory organics may include synthetic organic chemicals, such as polyelectrolyte treatment chemicals. Other biologically inhibitory and refractory organics include polychlorinated biphenyls, polycyclic aromatic hydrocarbons, polychlorinated dibenzo-p-dioxin, and polychlorinated dibenzofurans. Endocrine disrupting compounds are also a class of biologically inhibitory and refractory organics which can affect hormone systems in organisms and are found in the environment. Examples of endocrine disrupting compounds include: alkylphenolics, such as nonylphenol used for removing oil as well as natural hormones and synthetic steroids found in contraceptives, such as 17-b-estradiol, estrone, testosterone, ethynyl estradiol.

Other examples of wastewaters to be treated include: high strength wastewater; low strength wastewater; and leachate from landfills. Waters may also be treated to remove viruses. Other examples of pollutants in wastewater include: flame retardants, solvents, stabilizers, polychlorinated biphenyls (PCBs); dioxins; furans; polynuclear aromatic compounds (PNAs); pharmaceuticals, petroleum; petrochemical products; petrochemical byproducts; cellulose; waste products from the pulp and paper industry, phosphorous; phosphorous compounds and derivatives; and agricultural chemicals such as those derived from or used to produce fertilizers, pesticides, and herbicides.

Wastewater from industrial and municipal sources may also contain trace constituent compounds that originate during the water treatment process and are subsequently difficult to remove. Examples of trace constituents introduced during the water treatment process include nitrosamines, such as N-nitrosodimethylamine (NDMA) which may be released from proprietary cationic and anionic resins.

As used herein, "low concentration wastewater" refers to wastewater having a low concentration of biologically labile (i.e., easy-to-digest) organic compounds, which is lower than the influent feed concentration that typically supports a biological treatment system in a conventional secondary treatment system such as an activated sludge aeration processes or a membrane biological reactor. In addition, as used herein, "low concentration wastewater" includes influents that are not amenable to biological oxidation in a traditional treatment biological system as the wastewater is too low in strength or contains compounds that are not easily biologically degraded. They can also contain compounds entirely resistant to bio-decomposition, biologically inhibitory compounds, and/or biologically refractory compounds, or a combination of these, which either cannot be oxidized biologically, or require much longer residence times than that which is typically available to a biological oxidation system.

In addition, as used herein, "effluent subjected to upstream wastewater treatment" generally means effluent from one or more conventional or any later-developed wastewater treatment systems. The "effluent subjected to upstream wastewater treatment" can be derived from wastewater that was subjected to preliminary and/or primary treatment processes, and secondary treatment processes, e.g., activated sludge aeration processes or membrane biological reactors, and generally has a low concentration of biologically labile (i.e., easy-to-digest) organic compounds, which would not typically be sufficient to support a biological reaction in most conventional secondary treatment systems such as activated sludge aeration processes or membrane biological reactors. In addition, it is also contemplated in certain embodiments of the present invention that "effluent subjected to upstream wastewater treatment" is effluent that has also been subjected to one or more conventional or later-developed tertiary treatments. For instance, in certain wastewater treatment facilities, effluent from a tertiary treatment system can contain contaminants levels that exceed the mandated discharge levels, and such effluent can be treated by the system and method of the present invention. In further embodiments, the "effluent subjected to upstream wastewater treatment" can be derived from a primary separation system in which substantially all solids have been removed, such as one or more of settlers, clarifiers or other solid separation devices. In still further embodiments, "effluent subjected to upstream wastewater treatment" can include wastewater that has been subjected to a primary separation system followed by irradiation.

In general, wastewater treatment facilities use multiple treatment stages to clean water so that it may be safely released into bodies of water such as lakes, rivers, and streams. Presently, many sanitary sewage treatment plants include a preliminary treatment phase in which mechanical means are used to remove large objects (e.g., bar screens), and a sand or grit channel where sand, grit and stones settle. Some treatment systems also include a primary stage where certain fats, greases and oils float to the surface for skimming, and heavier solids settle to the bottom, and are subsequently treated in an aerobic or anaerobic digester to digest biomass and reduce the levels of biological solids.

After preliminary and/or primary treatment, the wastewater is then sent to a secondary biological activated sludge treatment phase. Biological treatment of wastewater is widely practiced. Wastewater is commonly treated with waste activated sludge, in which biological solids are acted upon by bacteria within a treatment tank. Activated sludge processes involve aerobic biological treatment in an aeration tank, typically followed by a clarifier/settling tank. Settled sludge is recycled back to the aeration tank in order to maintain an adequate mixed liquor suspended solids concentration to digest the contaminants. Some alternatives available for disposal of excess bio-solids, e.g., sludge, include but are not limited to incineration, disposal in a landfill, or use as fertilizer if there are no toxic components.

In the aeration tank, an oxygen-containing gas such as air or pure oxygen is added to the mixed liquor. Oxygen is typically used by the bacteria to biologically oxidize the organic compounds that are either dissolved or carried in suspension within the wastewater feed. Biological oxidation is typically the lowest cost oxidation method available to remove organic pollutants and some inorganic compounds, such as ammonia and phosphorous compounds, from wastewater and is the most widely used treatment system for wastewater contaminated with biologically treatable organic compounds. Wastewaters that contain compounds entirely resistant to bio-decomposition, biologically inhibitory compounds, and/or biologically refractory compounds may not be adequately treated by a conventional simple biological wastewater treatment system. These compounds can only be acted upon by the bacteria during a hydraulic retention time within the specific treatment tank. Because the hydraulic retention time is generally insufficient for biological oxidation of a sufficient quantity of the biologically inhibitory compounds and/or biologically refractory compounds, it is likely that some portion of these recalcitrant compounds may not be adequately treated or destroyed and can pass through a treatment process unchanged or only partially treated prior to discharge in either an effluent or excess residual sludge.

The mixed liquor effluent from the aeration tank typically enters a clarifier/settling tank where sludge, including concentrated mixed liquor suspended solids, settles by gravity. Settled biomass is wasted, i.e., discharged, to off-site disposal, or circulated back to the aeration tank. However, based on the wastewater and economic needs, some biological oxidation systems use a different treatment method to remove the solids from the wastewater effluent. The clarifier/settling tank can be replaced with a membrane operating system, or another unit operation such as a dissolved/induced air flotation device. The liquid effluent from the clarifier/settling tank, operating system or dissolved/induced air flotation device is either discharged or given further treatment prior to discharge. The solids that are removed from the clarification/separation device are returned to the aeration tank as return activated sludge in order to retain an adequate concentration of bacteria in the system. Some portion of this return activated sludge is periodically removed from this recycle line, known as waste activated sludge, in order to control the concentration of bacteria in the mixed liquor. This waste activated sludge is then disposed of in a predetermined manor.

One recent advance in conventional industrial biological wastewater treatment plant technology includes the addition of powdered activated carbon particles to the mixed liquor. In biological treatment processes utilizing powdered activated carbon, the organics can be adsorbed onto the activated carbon and remain within the treatment tank for a hydraulic retention time that is similar to the sludge residence time and therefore undergo both adsorptive and extended biological treatment that result in enhanced removal of certain biologically inhibitory or refractory compounds. In these processes, certain organic and inorganic compounds are physically adsorbed to the surface of the powdered activated carbon particles. At least a portion certain of these compounds are then biologically degraded, e.g., oxidized in an aerobic process, during the extended time that it is present in the system, and the remainder is adsorbed and discharged with the activated carbon when it is wasted from the system.

Powdered activated carbon has been used in conventional biological treatment plants because of its ability to adsorb biologically inhibitory and biologically refractory compounds, thereby providing an effluent with lower concentrations of these pollutants. Inclusion of powdered activated carbon in the mixed liquor provides a number of operational benefits. The carbon provides the advantages of a suspended media biological treatment system which include increased pollutant removal and increased tolerance to upset conditions. Additionally, the carbon allows the biologically inhibitory and biologically refractory compounds to adsorb onto the surface of the carbon and to be exposed to the biology for a significantly longer period of time than in a conventional biological treatment system, thereby providing benefits similar to that of a fixed film system. The carbon also allows for the evolution of specific strains of bacteria that are more capable of digesting the biologically inhibitory organic materials. The fact that the carbon is continuously recycled back to the aeration tank with the return activated sludge, i.e., the sludge residence time, means that the bacteria can work on digesting the biologically inhibitory organic compounds adsorbed onto the surface of the carbon for a period of time longer than the hydraulic detention time of the biological treatment system. This process also results in biological regeneration of the carbon and allows the carbon to remove significantly more biologically inhibitory and biologically refractory compounds than it could in a simple packed bed carbon filter system which would also require frequent replacement or costly physical regeneration of the carbon once the adsorption capacity of the carbon is exhausted. The carbon in the mixed liquor can also adsorb certain compounds and therefore provide an effluent that is free of or has a substantially reduced concentration of compounds that are not treatable by conventional biological oxidation or otherwise entirely resistant to bio-decomposition. One example of a known powder activated carbon system is offered by Siemens Water Technologies under the trademark "PACT®."

However, because both biological growth and adsorption of organic and inorganic compounds occurs on the activated carbon in powder form, wasting of excess solids is required. In addition, the powdered activated carbon is discharged from the treatment process with the removal of biosolids and must, therefore, be continually replaced. The primary mode of contaminant removal in a PACT® system is adsorption, with a secondary function of biological regeneration of organics adsorbed on the powdered activated carbon; the powdered activated carbon is not retained in the system for a sufficient period of time for biological regeneration to be the primary treatment mechanism.

Increasingly, sanitary wastewater is being treated using membrane biological reactor technology, which offers improved effluent quality, a smaller physical footprint (more wastewater can be treated per unit area), increased tolerance to upsets, improved ability to process hard-to-treat wastewaters and a variety of other operational advantages. For example, wastewaters containing high total dissolved solids can experience settling problems in a conventional clarifier/settling tank and requires significantly more difficult-to-operate solids separation devices such as a dissolved/induced air flotation device or some other solids removal system. However, while membrane biological reactors eliminate the settling problems experienced with clarifier/settling tank systems, they often present problems of membrane fouling and foaming that do not occur in conventional systems using clarifiers. Membrane fouling may be the result of extra-cellular polymeric compounds that result from the break-down of the biological life forms in the mixed liquor suspended solids, accumulation of organic materials such as oils, or by scaling caused by inorganic materials.

In addition, to date, membrane biological reactors have not been utilized commercially with powdered activated carbon addition. There has been some use of powdered activated carbon in surface water treatment systems that utilize membranes for filtration. However, it has been reported that these surface water treatment systems using membranes and powdered activated carbon have problems with the carbon abrading the membranes and the carbon permanently plugging and/or fouling the membranes.

Industrial wastewater that must be treated prior to discharge or reuse often include oily wastewaters, which can contain emulsified hydrocarbons. Oily wastewaters can come from a variety of industries including steel and aluminum industries, chemical processing industries, automotive industries, laundry industries, and crude oil production and petroleum refining industries. As discussed above, a certain amount of non-emulsified oils and other hydrocarbons may be removed in primary treatment processes, where floating oils are skimmed from the top. However, biological secondary wastewater processes are generally employed to remove the remaining oils from wastewater, typically the dissolved and emulsified oils, though some free oil may exist. Typical hydrocarbons remaining after primary treatment can include lubricants, cutting fluids, tars, grease, crude oils, diesel oils, gasoline, kerosene, jet fuel, and the like. These hydrocarbons typically must be removed prior to discharge of the water into the environment or reuse of the water in the industrial process. In addition to governmental regulations and ecological concerns, efficient removal of the remaining hydrocarbons also has benefits, as adequately treated wastewater may be used in many industrial processes and eliminate raw water treatment costs and reduce regulatory discharge concerns.

Other types of wastewater that must be treated includes contaminated process water from other industrial processes such as manufacturing of pharmaceuticals, various goods, agricultural products (e.g., fertilizers, pesticides, herbicides), and paper processing, as well as medical wastewater.

Commercial deployment of membrane biological reactors in the treatment of oily/industrial wastewater has been very slow to develop, mainly due to maintenance problems associated with oil and chemical fouling of the membranes. Testing of industrial/oily wastewater treated in a membrane biological reactor having powdered activated carbon added to the mixed liquor indicated the same treatment advantages as observed in conventional biological wastewater treatment systems including powdered activated carbon. It was also noted that the advantages of using a membrane biological reactor can also achieved. A side-by-side comparison of membrane biological reactors with and without the addition of powdered activated carbon demonstrated that the membrane biological reactor with powdered activated carbon provided treatment advantages as compared to the membrane biological reactors without activated carbon. Additionally, the membrane biological reactor without the carbon addition was very difficult to operate because of dissolved organics and extra cellular polymeric compounds fouling the membranes. However, testing further demonstrated that while the addition of powdered activated carbon provided a very viable biological wastewater treatment system, the carbon had the deleterious effect of a significant amount of abrasion to and non-reversible fouling of the membranes. This abrasion and non-reversible fouling was significant enough to result in this system being very costly to operate, because of the significantly decreased life expectancy of the membranes and membrane cleaning frequency.

Traditional biological oxidation of wastewater is commonly a secondary treatment step used to remove the majority of the wastewater contaminants, as it is typically the least costly oxidation method available to treat the organic compounds in the wastewater. In addition, to a lesser extent, a biological system can also remove some inorganic compounds, as some of the inorganic contaminants that can either be oxidized (e.g., ammonia, phosphates), adhere to the biomass, or can be absorbed by the biomass. If it is absorbed by the biomass it is ultimately discharged with the waste activated sludge.

Notwithstanding the advances and developments in biological oxidation processes and other secondary treatments, many secondary treatment systems are not capable of adequately treating the wastewater feed by biological oxidation alone. Wastewater effluent that has been subjected to secondary treatment sometimes does not have sufficiently low levels of organic and/or inorganic contaminants to allow discharge or reuse in compliance with regulatory limits. Accordingly, tertiary treatment steps are often required.

Conventional tertiary treatment steps often include passage of effluent that has been subject to secondary treatment through one or more adsorbent columns, including adsorbent material such as activated carbon, commonly known as "polishing." Other tertiary treatment processes can include passing the secondary treatment effluent through one or more filters, coalescers, UV oxidation, chemical oxidation, other tertiary treatment system, or a combination of these systems. However, these tertiary treatment systems are often large and/or expensive to operate. A key reason for the problematic size and expense of conventional tertiary treatment systems is that the entire secondary treatment effluent having a relatively low concentration of contaminants, or a substantial portion thereof, are subject to these treatments.

The systems and methods of the present invention obviate the drawbacks of existing tertiary treatment systems, and in certain embodiments provide a system that can be used as a secondary or tertiary treatment system, particularly when the wastewater to be treated is a low concentration wastewater.

The present invention is directed to an improved wastewater treatment process and system for treating a wastewater stream that has a flow rate similar to the influent flow rate, i.e., high flux, in a biological treatment system that has a low flux. This is achieved by adsorbing the contaminants in the high flux stream onto adsorbent material and then biologically regenerating and/or reactivating the adsorbent material in a suspended media membrane biological regeneration reactor system. This system is particularly useful for the processing of low concentration wastewater that is not particularly suitable for conventional biological wastewater treatment because of the low level of biologically labile compounds.

In certain embodiments, the wastewater treatment process and system for low contaminant concentration wastewater is useful as a tertiary treatment system, in which a substantial portion of effluent that has been subjected to secondary treatment and/or other upstream treatment is exposed to a high flux adsorbent material treatment, and a minor portion having a relatively higher level of contaminants adsorbed on the adsorbent material is subjected to a low flux adsorbent biological regeneration treatment system to regenerate the adsorbent material.

The system and method for treatment of wastewater of the present invention comprehends a treatment system which includes a high flux adsorbent material treatment system integrated with a low flux adsorbent material biological regeneration reactor. In general, the high flux adsorbent material treatment system includes one or more unit operations for mixing low concentration wastewater, or other wastewater containing compounds entirely resistant to bio-decomposition, biologically inhibitory compounds, and/or biologically refractory compounds, or a combination of these, with adsorbent material and decanting liquid effluent having a reduced concentration of contaminants.

The adsorbent material having contaminants from the low concentration wastewater adsorbed on its surface and/or on the surface of pore walls is passed to a low flux adsorbent material biological regeneration reactor in which biological micro-organisms degrade organic and certain inorganic contaminants and provide an adsorbent material with lower concentrations of these compounds such that it can be reused as a fresh adsorbent. In certain embodiments in which the biological reactor is an aerobic biological reactor having a source of oxygen to support aerobic micro-organisms, the biological reaction includes biological oxidation, wherein organic contaminants in the wastewater are metabolized generally into carbon dioxide and water. Excess biomass is removed from the adsorbent material, and the regenerated adsorbent material is recycled to the high flux adsorbent material treatment system. Alternatively, the low flux adsorbent material biological reactor could be an anaerobic biological regeneration reactor system, for instance, in embodiments in which the compounds to be adsorbed onto the adsorbent material are more easily degraded in an anaerobic reactor.

In accordance with one or more embodiments, the present invention employs a system including a suspended media membrane biological reactor system, such as a granular activated carbon aeration reactor, followed by a membrane operating system, in which adsorbent material is substantially prevented from entering the membrane operating system, as described in PCT Publication Number WO/09085252, which is incorporated by reference herein.

In one preferred embodiment, the present invention provides a tertiary treatment process including the steps of: mixing adsorbent material with low concentration wastewater; settling the adsorbent material; decanting or otherwise removing the water contacted by the adsorbent material; treating the adsorbent material having adsorbed contaminants in a biological regeneration reactor; treating mixed liquor from the biological reactor, including mixed liquor suspended solids and mixed volatile liquor suspended solids, that is substantially free of adsorbent material, in a membrane operating system; removing excess biomass from the adsorbent material; and recycling the adsorbent material to the step of mixing it with the low concentration wastewater in a high flux adsorbent material treatment system. Advantageously, the decanted supernatant includes a substantial portion of low concentration wastewater. Accordingly, the biological regeneration reactor and the membrane operating system are employed to treat only a small portion of the volume of the total low concentration wastewater effluent previously subjected to upstream treatment in prior art processes. A cost-effective treatment is thereby provided for low concentration wastewater, especially as compared to conventional tertiary treatment systems such as granular activated carbon adsorption columns typically utilized for polishing wastewater discharged from a secondary treatment zone. These systems typically regenerate the adsorbent material with energy intensive regeneration processes such as hot air regeneration or steam regeneration.

The low concentration wastewater treatment system of the present invention includes adsorbent material which in certain preferred embodiments is granular activated carbon, in one or more vessels arranged to adsorb organic compounds in low concentrations. The adsorbed organics are subsequently exposed to biological micro-organisms in a low flux adsorbent material biological reactor for a period of time that is much longer than the typical hydraulic residence time in granular activated carbon filters. The low concentration wastewater treatment system and process of the present invention concentrates these organic compounds from the effluent that has been subjected to upstream wastewater treatment. Accordingly, when employed as a tertiary treatment system, the low concentration wastewater treatment system and process of the present invention allows organic contaminants to be exposed to bacteria for a longer period of time than could normally be achieved based on the flux of the upstream wastewater treatments in conventional secondary treatment systems. Thus, the time for biological reaction, for instance, biological oxidation in embodiments in which the microorganisms are aerobic bacteria, is substantially increased. The use of biological regeneration rather than the energy intensive systems typically employed to regenerated granular activated carbon in polishing filters, is a much more cost effective regeneration system.

In accordance with one or more embodiments, the low concentration wastewater treatment system of the present invention includes adsorbent material which in certain preferred embodiments is granular activated carbon, in one or more vessels arranged to adsorb organic compounds in low concentrations. The low concentration wastewater treatment system and process of the present invention concentrates these organic compounds from the effluent that has been subjected to upstream wastewater treatment. Accordingly, when employed as a tertiary treatment system, the low concentration wastewater treatment system and process of the present invention allows organics to be exposed to bacteria for a longer period of time than could normally be achieved based on the flux of the upstream wastewater treatments in conventional tertiary treatment systems, e.g., carbon polishing systems. Thus, the time for biological reaction, for instance, biological oxidation in embodiments in which the microorganisms are aerobic bacteria, is substantially longer than could be achieved in a biological reactor treating the entire influent flow.

In addition, in accordance with one or more embodiments, the low concentration wastewater treatment system and process of the present invention uses adsorbent material such as granular activated carbon to adsorb the contaminants from the low concentration wastewater, e.g., a full flow low concentration wastewater stream from a secondary treatment system, and transfers the adsorbent material having the adsorbed contaminants into a relatively small membrane biological reactor system having an arrangement similar to the membrane biological reactor system described in co-pending and commonly-owned PCT application number PCT/US10/38644, which is incorporated herein by reference, and in PCT Publication Number WO/09085252, which is also incorporated by reference herein. The organic compounds that are adsorbed on the adsorbent material are biologically treated in a suspended media membrane biological reactor system, and accordingly obviates the need to treat the entire wastewater flow and organic load from the upstream wastewater treatment system. In embodiments in which the suspended media membrane biological reactor system is an aerobic system, the biomass is supplied with the requisite oxygen for biological oxidation by using air or oxygen from an air diffuser and/or other source. In embodiments in which the suspended media membrane biological reactor system is an anaerobic biological reactor, the system is operated under requisite conditions to anaerobically degrade the compounds. A relatively small membrane biological reactor system can thus treat the organic compounds that are present in low concentrations in the high flux stream of effluent subjected to upstream wastewater treatment.

In addition, while certain embodiments of the present invention are described as tertiary systems and processes for treating effluent from one or more upstream wastewater treatment processes, including primary and/or secondary processes, it will be appreciated by a person of ordinary skill in the art that the systems and methods of the present invention can be employed to treat wastewater effluent directly from certain processes having low concentrations of organics, for instance, which would not effectively support the biology in a conventional biological reactor.

Figure 2:
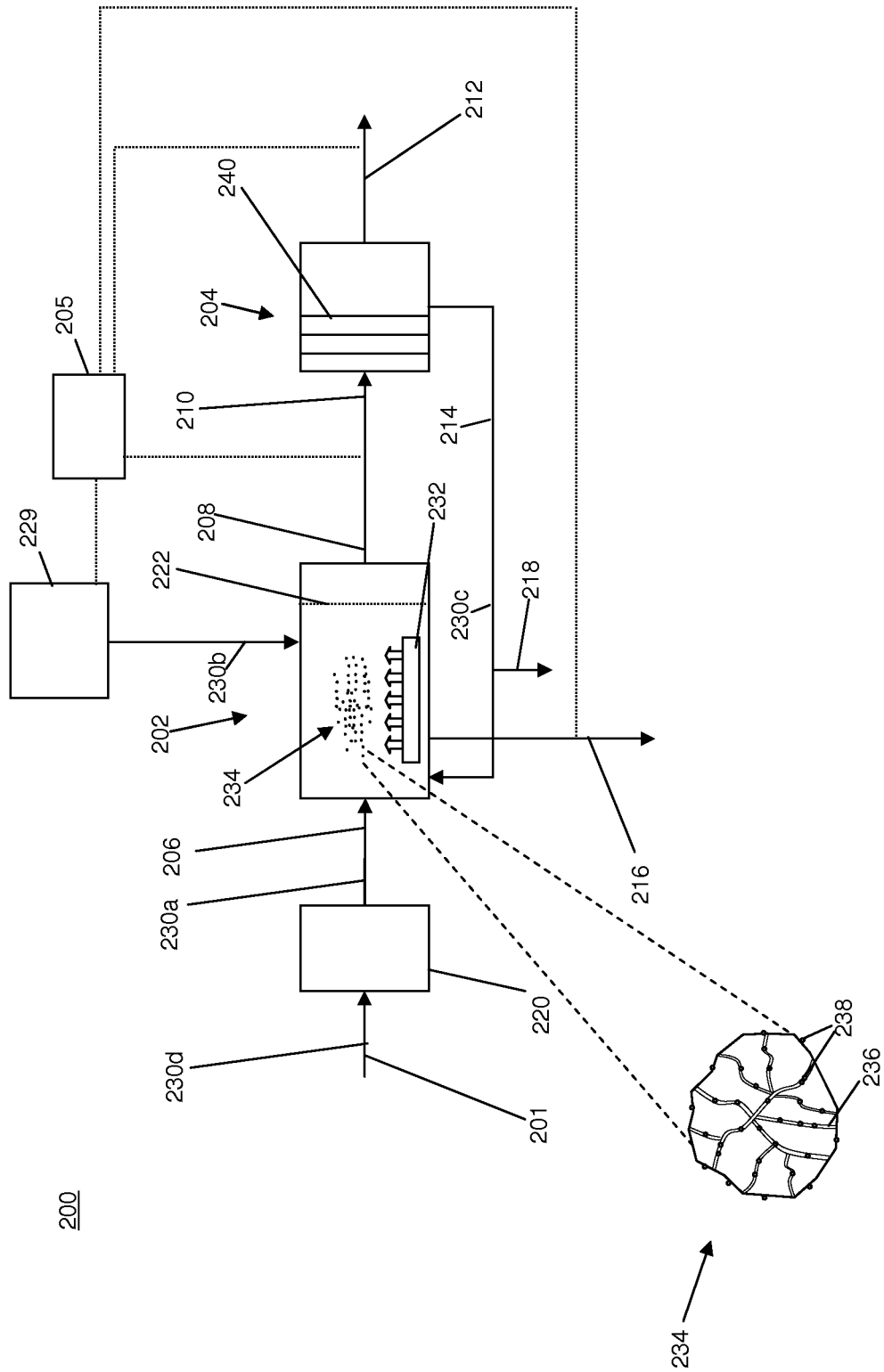
FIG. 2 is a schematic diagram of an embodiment of a system for treatment of wastewater using adsorbent material in a biological reactor upstream of a membrane operating system used in the present invention to regenerate and/or reactivate adsorbent material.

FIGS. 1 and 2 are representations of suspended media membrane biological reactor systems suitable for integration with the system of the present invention for treating low concentration wastewater, and in particular, for regenerating and/or reactivating adsorbent material having contaminants adsorbed thereon in a high flux adsorption step. These systems, described in PCT application number PCT/US10/

38644 and in PCT Publication Number WO/09085252, provide for use of adsorbent material such as granular activated carbon in a biological reactor system upstream of a membrane operating system. In particular, the systems include a separation subsystem that substantially prevents adsorbent material from passing to the membrane operating system and thereby abrading, fouling or otherwise damaging the membranes therein.

Referring now to FIG. 1, a wastewater treatment system 100 is schematically depicted including a biological reactor system 102 upstream of a membrane operating system 104. In certain embodiments, biological reactor system 102 includes a single biological reactor vessel. In additional embodiments, biological reactor system 102 includes a plurality of biological reactor vessels, one biological reactor vessel divided into separate sections, or a plurality of biological reactor vessels some or all of which can be divided into separate sections. The individual reactor vessels or segregated sections are referred to herein generally as a biological reaction zone. During wastewater treatment operations using the suspended media membrane biological reactor systems, adsorbent material along with micro-organisms are maintained in suspension in all of the biological reaction zones or a subset of the total number of biological reaction zones. The membrane operating system 104 is maintained substantially free of adsorbent material using one or more of the separation subsystems described herein. An influent wastewater stream 106 is introduced from a primary treatment system, a preliminary screening system, or as a direct flow of previously untreated wastewater. In further embodiments, the influent wastewater stream 106 can be previously treated wastewater, e.g., an effluent from one or more upstream biological reactors, including, but not limited to, aerobic biological reactors, anoxic biological reactors, continuous flow reactors, sequencing batch reactors, or any number of other types of biological treatment systems capable of biologically degrading organic and in certain embodiments some inorganic compounds.

The biological reactor(s) and/or certain biological reactor zones can be various types of biological reactors, including but not limited to aerobic biological reactors, anoxic biological reactors, anaerobic biological reactors, continuous flow reactors, sequencing batch reactors, trickling filters, or any number of other types of biological treatment systems capable of biologically degrading organic and in certain embodiments some inorganic compounds.

In addition, the biological reactor(s) and/or certain biological reactor zones used herein can be of any size or shape suitable to suspend adsorbent material in conjunction with the suspension system. For example, the vessel may have a cross sectional area of any shape, such as circular, elliptical, square, rectangle, or any irregular shape. In some embodiments, the vessel can be constructed or modified in order to promote suitable suspension of the adsorbent material.

FIG. 2 schematically depicts the process flow of a wastewater treatment system 200 for producing a treated effluent having reduced concentrations of biologically labile, biologically refractory, biologically inhibitory and/or organic and inorganic compounds that are entirely resistant to biological decomposition. System 200 generally includes a biological reactor 202 and a membrane operating system 204. Biological reactor 202 includes an inlet 206 for receiving wastewater and an outlet 208 for discharging effluent that has been biologically treated, including mixed liquor volatile suspended solids and/or mixed liquor, to the membrane operating system 204.

The biological reactor 202 includes a distributed mass of adsorbent material 234 having pores 236, and an effective amount of one or more micro-organisms 238, that are both adhered to the adsorbent material and free-floating and separate from the adsorbent material in the mixed liquor, for acting on biologically labile and certain biologically refractory and/or biologically inhibitory compounds in the mixed liquor. The adsorbent material adsorption sites, including the outer surface of the adsorbent granules or particles, and the wall surfaces of pores 236, initially serve as adsorption sites for the biologically labile, biologically refractory, biologically inhibitory and/or organic and inorganic compounds that are entirely resistant to biological decomposition. In addition, micro-organisms 238 can be adsorbed on the adsorption sites of the adsorbent material. This allows for higher digestion levels of certain biologically refractory and/or biologically inhibitory compounds without requiring proportionally longer hydraulic retention times and sludge retention times, due to the fact those certain biologically refractory and/or biologically inhibitory compounds are retained for extended periods of time on the adsorbent material, which are isolated or retained in the biological reactors.

Generally, biologically labile compounds and certain inorganics will be digested relatively quickly and predominantly by the micro-organisms that are not adhered to the adsorbent material, i.e., the free-floating micro-organisms in the mixed liquor. Certain components including organics and inorganics that are entirely resistant to biological decomposition and very refractory biologically refractory and biologically inhibitory compounds will remain adsorbed on the adsorbent material or can be adsorbed and/or absorbed by free-floating biological material in the reactor(s). Ultimately, these non-digestible compounds will concentrate on the adsorbent to the point where the removal, or wasting, and replacement of the adsorbent will be required to maintain the quality of effluent at an acceptable level. As the adsorbent material remains in the suspended media membrane biological reactor systems, micro-organisms grow and are generally retained on the adsorbent material long enough to break down at least a portion of certain biologically refractory and/or biologically inhibitory compounds in the particular influent wastewater, which have been concentrated on the adsorbent material. While not wishing to be bound by theory, it is believed that micro-organisms can eventually evolve into mature strains with specific acclimation necessary to break down at least a portion of certain hard-to-treat compounds in the particular influent wastewater. Over additional time, e.g., several days to several weeks, during which adsorbent material having certain biologically refractory and/or biologically inhibitory compounds is maintained in the system, the micro-organisms having a high degree of specificity become second, third, and higher generations, thereby increasing their efficacy to biodegrade at least a portion of certain of the specific biologically refractory and/or biologically inhibitory compounds that are present in the particular influent wastewater as the system becomes acclimated.

Various influent wastewaters can be deficient in certain nutrients beneficial to the biology that occurs in the biological reactor 202. Further, certain influent wastewaters can have pH levels that are excessively acidic or caustic. Accordingly, as will be apparent to a person having ordinary skill in the art, phosphorus, nitrogen, and pH adjustment materials, supplemental simple carbon or chemicals can be added to maintain optimal nutrient ratios and pH levels for the biological life and associated activity, including biological oxidation, in the reactor 202.

Effluent from the biological reactor 202 is introduced via a separation subsystem 222 to an inlet 210 of the membrane operating system 204. This transferred mixed liquor, having been treated in biological reactor 202, is substantially free of adsorbent material. In the membrane operating system 204, the wastewater passes through one or more microfiltration or ultra-filtration membranes, thereby eliminating or minimizing the need for clarification and/or tertiary filtration. Membrane permeate, i.e., liquid that passes through the membranes 240, is discharged from the membrane operating system 204 via an outlet 212. Membrane retentate, i.e., solids from the biological reactor 202 effluent, including activated sludge, is returned to the biological reactor 202 via a return activated sludge line 214.

Spent adsorbent material from the biological reactor 202, e.g., granular activated carbon that is no longer effective in adsorbing contaminants such as certain compounds entirely resistant to bio-decomposition, biologically refractory compounds and biologically inhibitory compounds, can be removed via a mixed liquor waste discharge port 216 of the biological reactor 202. A waste outlet 218 can also be connected to the return activated sludge line 214 to divert some or all the return activated sludge for disposal, for instance, to control the concentration of the mixed liquor and/or culture. Sludge is discharged from the apparatus with the waste activated sludge when it increases to the point where the mixed liquor solids concentration is so high that it disrupts the operation of the particular membrane biological reactor system. In addition, the mixed liquor waste discharge port 216 can be used to remove a portion of the adsorbent material, thereby removing some portion of the biologically refractory compounds, biologically inhibitory compounds, and/or organic and inorganic compounds that are entirely resistant to biological decomposition, rather than from the return activated sludge line with the waste activated sludge, resulting in a lower concentration of these biologically refractory compounds, biologically inhibitory compounds, and/or organic and inorganic compounds that are entirely resistant to biological decomposition in the discharge and a more stable biomass in the membrane biological reactor. An equivalent quantity of fresh or regenerated adsorbent material can then be added to replace the adsorbent thus removed.

A preliminary screening and/or separation system 220 can be provided upstream of the inlet 206 of the biological reactor 202. This preliminary screening and/or separation system can include a dissolved air floatation system, a coarse screen or a combination of these and/or other preliminary treatment devices for separating suspended matter of the type known in the art. Optionally, the preliminary screening and/or separation system 220 can be eliminated, or other types of preliminary treatment devices can be included, depending on the particular wastewater being treated.

In order to prevent at least a majority of the adsorbent material 234 from entering the membrane operating system 204 and causing undesirable abrasion and/or fouling of the membranes 240, separation subsystem 222 is provided. As shown, in FIG. 2, the separation subsystem 222 is located proximate the outlet of the biological reactor 202. However, in certain embodiments, the separation subsystem 222 can be positioned in a separate vessel downstream of the biological reactor 202. In either case, the separation subsystem 222 includes suitable apparatus and/or structures for preventing contact between at least a majority of the adsorbent 234 and the membranes 240 in the membrane operating system 204. Separation subsystem 222 can comprise one or more of a screening apparatus, a settling zone, and/or other suitable separation apparatus.

Suitable types of screens or screening apparatus for use in certain embodiments of the suspended media membrane biological reactor system include wedge wire screens, metal or plastic apertured plates, or woven fabrics, in cylindrical or flat configurations and arranged at various angles including vertically oriented, horizontally oriented, or at any angle therebetween. In further embodiments, an active screening apparatus can be employed such as a rotating drum screen, vibrating screen or other moving screening apparatus. In general, for systems in which the separation subsystem 222 is a screening apparatus, the mesh size is smaller than the bottom limit of the effective granule or particle size of the adsorbent material that is being used.

Other types of separation subsystems can also be used in the separation subsystem, as alternatives to, or in combination with, a screening apparatus. For instance, as further described below, a settling zone can be provided, in which adsorbent material settles by gravity.

In alternative embodiments, or in conjunction with previously described embodiments, separation subsystems can include a centrifugal system (e.g., hydrocyclone, centrifuge, or the like), an aerated grit chamber, a floatation system (such as induced gas flotation or dissolved gas), or other known apparatus.

Optionally, or in combination with the separation subsystem 222 proximate the outlet of biological reactor 202, a separation subsystem can be provided between biological reactor 202 and the membrane operating system 204 (not shown). This alternative or an additional separation subsystem can be the same as or different as separation subsystem 222, in type and/or dimension. For instance, in certain embodiments, a settling zone, a clarifier, a hydrocyclone separator, a centrifuge, or a combination of these can be provided as a distinct unit operation between biological reactor 202 and membrane operating system 204.

Note that the separation subsystem 222 is highly effective for preventing passage of adsorbent material in its original dimension to the membrane operating system. In certain preferred embodiments, the separation subsystem 222 prevents substantially all of the adsorbent material 234 from passage to the membrane operating system 204. However, during operation of the system 200, various causes of attrition of the adsorbent material, including inter-granule collisions, shearing, circulation, or collisions of granules within stationary or moving equipment, can cause particles to be created that are too small to be effectively retained with the separation subsystem 222. In order to minimize the detriment to the membranes and loss of adsorbent material to wasting, certain embodiments include a separation subsystem 222 that is capable of preventing passage of substantially all of the adsorbent material 234 within about 70 to about 80 percent of its original dimension. The acceptable percentage reduction in the original dimension can be determined by a person having ordinary skill in the art, for instance, based on an economic evaluation. If the reduction in the dimension results in an increase in the particles passing through the screening system, the membranes will experience increased abrasion. Thus, a cost-benefit analysis can be used to determine what is an acceptable percentage reduction of adsorbent material based on the cost of abrasion and eventual replacement of the membranes as compared to the costs associated with adsorbent material that minimizes breakage, and handling and operational costs associated with a separation subsystem capable of preventing passage of particles much smaller than the original adsorbent material granules or particles. In addition, in certain embodiments, some degree of inter-granule collisions, or collisions of granules within stationary or moving equipment, is desirable to strip excess biomass from the outer surfaces of the adsorbent material.

Screened or separated mixed liquor effluent from the biological reactor 202 can be pumped or flow by gravity (depending on the design of the particular system) into the membrane operating system 204. In a system using an external separation subsystem (not shown), the apparatus is preferably configured such that adsorbent material separated from the mixed liquor passing through an external fine screen or separator subsystem falls by gravity back into the biological reactor 202.

Adsorbent material such as granular activated carbon, e.g., suitably pre-wetted to form a slurry of adsorbent material, can be added to the wastewater at various points in the system 200, e.g., from a source 229 of adsorbent material. As shown in FIG. 2, adsorbent material can be introduced at one or more locations 230a, 230b, 230c and/or 230d. For instance, adsorbent material can be added to the feedstream downstream of the preliminary screening system 220 (e.g., location 230a). Optionally, or in combination, adsorbent material can be added directly to the biological reactor 202 (i.e., location 230b). In certain embodiments, adsorbent material can be introduced via the return activated sludge line 214 (e.g., location 230c). In additional embodiments, it can be desirable to add the adsorbent material upstream of the preliminary screening system 220 (e.g., location 230d), where the preliminary screening system 220 is designed specifically for this application by including screening that allows the adsorbent material to pass through and into the biological reactor 202. Mixed liquor passes through the separation subsystem 222 and the adsorbent material is substantially prevented from passing into the membrane operating system 204 with the mixed liquor suspended solids.

As the adsorbent material remains in the system and is exposed to wastewater constituents including biologically refractory, biologically inhibitory compounds and/or organic and inorganic compounds that are entirely resistant to biological decomposition, some or all of the adsorbent material will become ineffective for treating the constituents, i.e., the adsorption capacity decreases. This will result in a higher concentration of these constituents entering the membrane operating system 204, where they pass through the membranes, and are discharged with the membrane effluent 212. In addition, adsorbent material can become ineffective due to coating with bacteria, polysaccharides and/or extracellular polymeric substances. This layer of coating can reach levels where it blocks the pore sites and thereby prevents access for biologically refractory, biologically inhibitory and/or organic and inorganic compounds that are entirely resistant to biological decomposition, and consequently prevents adsorption and inhibits biodegradation. In certain embodiments of suspended media membrane biological reactor systems, this coating can be removed by a shearing action produced by one or more mechanisms in the system, such as collisions between adsorbent material granules suspended in the mixed liquor or shearing forces associated with suspension and/or movement of the adsorbent material.

When adsorbent material has lost all or a portion of its efficacy for reducing the effluent concentration of biologically refractory, biologically inhibitory and/or organic and inorganic compounds that are entirely resistant to biological decomposition, a portion of the adsorbent material can be wasted via waste port 216, e.g., by discharging a portion of the mixed liquor containing adsorbent material dispersed therein.

Additional fresh or regenerated adsorbent material can be introduced into the system, as described above, via adsorbent material introduction apparatus 229 and/or at one or more suitable addition locations. The inlet wastewater and the effluent wastewater COD compound concentrations and/or inorganic compound concentrations, can be monitored to determine when the adsorbent material and its accompanying biomass in the system have experienced reduced effectiveness. A plot of the difference between the inlet and effluent COD divided by the inlet COD concentration will show gradual loss of the efficacy of the adsorbent material in the mixed liquor. The same type of plot can be used to monitor the inorganic removal capacity or the removal of a specific organic species in the system. The amount of COD removed from the feed stream can provide an indication of the relative amount of biologically refractory and/or biologically inhibitory organic compounds that are being removed from the wastewater feed. As the operators of the system develop experience with treating a particular wastewater, they will be able to determine when this ratio indicates a point at which there is a need to remove a portion of the adsorbent material in the biological reactor and replace it with fresh adsorbent material. The system's required efficiency will thus be regained for the compounds that are biologically refractory, biologically inhibitory and/or entirely resistant to bio-decomposition, for instance, to produce an effluent that is in compliance with regulatory requirements. Sampling and analysis of the effluent for concentrations of specific organic and inorganic compounds can also be used to determine when efficacy of the adsorbent material and its accompanying biomass in the mixed liquor has been reduced and partial replacement should be initiated.

The operator of a suspended media membrane biological reactor system 200 can begin replacing some of the adsorbent material when the effluent concentrations of specific organic or inorganic compounds start to approach the facility's permitted discharge concentrations for these compounds. The allowed discharge concentrations are typically limited by the facility's permit, for instance, as determined by the National Pollutant Discharge Elimination System (NPDES) permit program that is regulated by the United States Environmental Protection Agency, or other similar regulating body in a particular state or nation. As operators gain experience in operating this system with their particular wastewater, they will be able to anticipate when to commence replacement of adsorbent material. When the operator determines that the efficacy of the adsorbent material and its accompanying biomass is approaching an inability to achieve the requisite effluent concentration of pollutants, the normal wasting of excess biomass that is performed by wasting return activated sludge from line 218 can cease and the excess biomass and the accompanying adsorbent material is wasted from the biological reactor 202 via waste port 216. The amount of material wasted is determined by what is required to maintain the mixed liquor suspended solids within the optimum operating range for the particular membrane biological reactor system. After replacement of a portion of the adsorbent material, the effluent is monitored by the operator to determine whether the requisite contaminant removal efficiency has been restored. Additional replacement can be made as needed based on operating experience.

In some embodiments, the system and/or individual apparatus of the system can include a controller to monitor and adjust the system as desired. A controller can direct any of the parameters within the system depending upon the desired operating conditions, which may, for example, be based on governmental regulations regarding effluent streams. The controller can adjust or regulate valves, feeders or pumps associated with each potential flow based upon one or more signals generated by sensors or timers positioned within the system or individual apparatus. The controller can also adjust or regulate valves, feeders or pumps associated with each potential flow based upon one or more signals generated by sensors or timers, which indicate a specific trend, for example an upward or downward trend in a characteristic or property of the system over a predetermined period of time. For example, a sensor in an effluent stream can generate a signal indicating that the concentration of pollutants such as biologically refractory compounds, biologically inhibitory compounds, and or compounds entirely resistant to bio-decomposition has reached a predetermined value or trend, or indicating that the COD level has reached a predetermined value or trend thereby triggering the controller to perform some act upstream from, downstream from, or at the sensor. This act can include any one or more of removing adsorbent material from the biological reactor, adding new or regenerated adsorbent material to the biological reactor, adding a different type of adsorbent material, adjusting flow of the wastewater at the feed inlet or inlet to another apparatus within the system, redirecting flow of the feed inlet or inlet to another apparatus within the system to a storage tank, adjusting air flow within the biological reactor, adjusting residence time within the biological reactor or other apparatus, and adjusting temperature and/or pH within the biological reactor or other apparatus. One or more sensors can be utilized in or with the one or more apparatus or streams of the system to provide an indication or characteristic of the state or condition of any one or more processes being performed in the system.

The system and controller of one or more embodiments of the suspended media membrane biological reactor system provide a versatile unit having multiple modes of operation, which can respond to multiple inputs to increase the efficiency of the wastewater treatment system. The controller can be implemented using one or more computer systems which can be, for example, a general-purpose computer. Alternatively, the computer system can include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory can be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code can be written in any of a plurality of programming languages or combinations thereof.

Components of the computer system can be coupled by one or more interconnection mechanisms, which can include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system can contain one or more interfaces that can connect the computer system to a communication network, in addition or as an alternative to the network that can be formed by one or more of the components of the system.

According to one or more embodiments of the suspended media membrane biological reactor system, the one or more input devices can include sensors for measuring any one or more parameters of system and/or components thereof. Alternatively, one or more of the sensors, pumps, or other components of the system, including metering valves or volumetric feeders, can be connected to a communication network that is operatively coupled to the computer system. Any one or more of the above can be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms can be affected by utilizing any suitable technique including but not limited to those utilizing wireless protocols.

Although the computer system is described by way of example as one type of computer system upon which various aspects of the suspended media membrane biological reactor system and the present invention can be practiced, it should be appreciated that the invention is not limited to being implemented in software, or on the computer system as exemplarily shown. Indeed, rather than implemented on, for example, a general purpose computer system, the controller, or components or subsections thereof, can alternatively be implemented as a dedicated system or as a dedicated programmable logic controller (PLC) or in a distributed control system. Further, it should be appreciated that one or more features or aspects of the suspended media membrane biological reactor system and the present invention can be implemented in software, hardware or firmware, or any combination thereof. For example, one or more segments of an algorithm executable by a controller can be performed in separate computers, which in turn, can be in communication through one or more networks.

In some embodiments, one or more sensors can be included at locations throughout the system 200, which are in communication with a manual operator or an automated control system to implement a suitable process modification in a programmable logic controlled membrane biological reactor system. In one embodiment, system 200 includes a controller 205 which can be any suitable programmed or dedicated computer system, PLC, or distributed control system. The concentration of certain organic and/or inorganic compounds can be measured at the membrane operating system effluent 212 or the effluent from outlet 208 of the biological reactor 202, as indicated by dotted line connections between the controller 205 and both the effluent line 212 and the intermediate effluent line between outlet 208 and inlet 210. In another embodiment, the concentration of volatile organic compounds or other property or characteristic of the system can be measured at one or more of inlets 201, 206, or 210. Sensors known to those of ordinary skill in the art of process control apparatus can include those based on laser-induced fluorescence or any other sensor suitable for in situ real time monitoring of the concentration of organic or inorganic compounds in the effluent or other property or characteristic of the system. Sensors that can be used include submersible sensors for use in oil-in-water measurement which use UV fluorescence for detection, such as enviroFlu-HC sensors available from TriOS Optical Sensors (Oldenburg, Germany). The sensors may comprise lenses which are coated or otherwise treated to prevent or limit the amount of fouling or film that occurs on the lenses. When one or more sensors in the system generate a signal that the concentration of one or more organic and/or inorganic compounds exceeds a predetermined concentration, the control system can implement a responsive action such as a suitable feedback action or feedforward action, including but not limited to removing adsorbent material via waste discharge port 216 (as indicated by dotted line connections between the controller 205 and the waste discharge port 216); adding new or regenerated adsorbent material via adsorbent material introduction apparatus 229 or at one of the other locations (as indicated by dotted line connections between the controller 205 and the adsorbent material introduction apparatus 229); adding a different type of adsorbent material; modifying the hydraulic retention time; modifying the biological characteristics such as simple carbon food for micro-organisms or adding phosphorus, nitrogen and/or pH adjustment chemicals; and/or other modifications as described above or that will be apparent to those of ordinary skill in the art.

Note that while the controller 205 and the adsorbent material introduction apparatus 229 are shown only with respect to FIG. 2, it is intended that these features and the various feedback and feedforward capabilities can be incorporated in any of the systems described herein. In addition, the controller 205 can be electronically connected to other components such as a wastewater feed pump and the suspension system 232.

After the mixed liquor is aerated and treated by the adsorbent material in the biological reactor 202, the processed mixed liquor passes through separation subsystem 222, and is transferred to the membrane operating system 204 substantially free of adsorbent material. The separation subsystem 222 prevents adsorbent material from passing into the membrane operating system 204. By maintaining the adsorbent material in the biological reactor 202, or otherwise upstream of the membrane operating system 204, the suspended media membrane biological reactor system minimizes or eliminates the likelihood of fouling and/or abrasion of the membrane operating system tank membranes by the adsorbent material.

The membrane operating system 204 contains filtering membranes 240 to filter the biomass and any other solids in the mixed liquor in the membrane operating system tank 204 from the effluent from the bioreactor 212. These membranes 240, which can be in the form of hollow fiber membranes or other suitable configurations, as is known to those of ordinary skill in the art, are typically very expensive and it is highly desirable to protect them from damage in order to maximize their useful life. In the suspended media membrane biological reactor system 200, the life of the membranes in the operating system tank are extended, since the separation subsystem 222 substantially reduces or eliminates entry of the adsorbent material such as granular activated carbon, and/or any other solid granules and particles, into the membrane operating system 204.

Outlet 212 transports filtered effluent from the membrane operating system tank 204. Return activated sludge line 214 transports a return activated sludge stream from the membrane operating system tank 204 to the biological reactor 202 for further use in processing of the wastewater feedstream. Excess sludge is wasted from the system using waste line 218 as in a conventional membrane biological reactor system.

The suspension system 232 utilizes one or more of jet suspension, mechanical mixing, coarse bubble aeration, gas lift suspension systems such as draft tube(s) and draft trough(s), and other types of mechanical or air suspension systems to maintain the adsorbent material 234 in suspension while minimizing attrition of the adsorbent material 234.

In certain embodiments, after an initial period of time in which the adsorbent material 234 is within the biological reactor 202 and some granule breakage occurs, e.g., some of the rough and/or protruding surfaces of the adsorbent material 234 break off and becomes powder, fines, needles or other smaller particulates, the adsorbent material 234 maintained in suspension by the suspension system 232 stabilizes, whereby little or no further breakage or degradation in size occurs.

The concentration of adsorbent material in the mixed liquor is generally determined based upon the specific system parameters and wastewater to treat the particular combination of biologically refractory and/or biologically inhibitory organic or inorganic compounds to meet a facility's discharge requirements. Testing has indicated that operating a membrane biological reactor with a typical industrial mixed liquor suspended solids concentration (in a normal range for the particular membrane biological reactor configuration employed) and an adsorbent material concentration, such as granular activated carbon, of about 20% (of the total mixed liquor suspended solids concentration) was adequate to remove the biologically refractory and/or biologically inhibitory organic compounds present in the wastewater feed without creating fouling problems on the screening system used. Higher concentrations of adsorbent material can be added to provide an additional margin of safety against process upsets that could cause higher than normal effluent concentrations of biologically refractory compounds, biologically inhibitory compounds, and/or organic or inorganic compounds entirely resistant to biological decomposition. Note that this additional adsorbent material will result in increased screening and/or settling requirements. The lowest concentration of adsorbent material that can be utilized and still achieve the required effluent quality can be empirically determined, based upon a desired margin of safety against process upsets that is based on experience or otherwise deemed appropriate for the particular system and process.

The suspended media membrane biological reactor systems using adsorbent material upstream of a membrane operating system tank to adsorb organic and inorganic materials (biologically refractory, biologically inhibitory or otherwise) as well as to provide for a suspended media membrane biological reactor is applicable for a variety of different configurations. In addition, various separation devices may also be used to maintain the adsorbent material in the biological reactor. It will be appreciated by one of ordinary skill in the art that different systems will have different economic benefits based on the individual characteristics of the wastewater and the region where the facility is to be installed.

The factors that are controlled to produce optimal treatment conditions include the type of adsorbent material, including its size, shape, hardness, specific gravity, settling rate, requisite air flow or other suspension needs for granule suspension in the mixed liquor, i.e., to maintain the granular activated carbon as a suspended media, the screen bar spacing or opening size and hole configuration, the concentration of adsorbent material in the mixed liquor, the concentration of the mixed liquor volatile suspended solids, the total concentration of mixed liquor suspended solids, the ratio of the return activated sludge flow rate divided by the flow rate of the mixed liquor entering the membrane operating system tank, the hydraulic retention time and the sludge retention time. This optimization provides adsorption of some portion of the biologically refractory compounds, easy to degrade biological oxygen demand compounds ($BOD_5$), biologically inhibitory compounds, organic or inorganic compounds entirely resistant to biological decomposition, and extra-cellular polymeric substances by the adsorbent material such as granular activated carbon suspended in the mixed liquor.

Another benefit of the suspended media membrane biological reactor system is that sites are provided to which the micro-organisms in the mixed liquor suspended solids can adhere. This aspect of the process produces a mixed liquor volatile suspended solids stream that is more stable and resilient in its response to upset conditions and allows enhanced biodegradation of the organics present in the wastewater as compared to a non-granular activated carbon enhanced membrane biological reactor operated with similar hydraulic retention times and sludge retention times. A source of micro-organisms inside the pore spaces, or on the surface, of the adsorbent material serves as a source of seed bacteria in the event of an upstream process upset resulting in the loss of some of the viable micro-organisms floating free in the mixed liquor. In the event of a thermal or toxic chemical shock to the system, which would, in conventional systems, terminate certain bacteria, some of the micro-organisms within the pore spaces or on the surface can survive, thus only a fraction of the recovery time is necessary as compared to conventional systems without adsorbent. For instance, in systems where the bacteria is mesophilic, the adsorbent can allow some bacteria within the pore sites to survive in the event of thermal shock due to increased temperature. Likewise, in systems where the bacteria is thermophilic, the adsorbent allows some bacteria within the pore sites to survive in the event of thermal shock due to decreased temperature. In both of these circumstances, the time required for the cultures to re-acclimate can be greatly reduced. In addition, in the event of a system shock that terminates all or a portion of the micro-organism population, the presence of adsorbent material allows for continued operation, in which labile, refractory, and inhibitory contaminants can be adsorbed while the micro-organism population is adjusted.

The various benefits have been shown to result in a more rapid acclimation of the mixed liquor to the wastewater feed, reduce fouling of the membranes, an improved tolerance to variations in feed concentrations and flow rate, produce a sludge that can be dewatered more quickly with a less oily nature that is easier to handle, and an effluent having a lower concentration of organic and inorganic impurities than can be obtained from a conventional membrane biological reactor apparatus.

The use of an adsorbent such as granular activated carbon in place of powdered activated carbon allows the elimination of the membrane fouling and/or abrasion that have been identified as a problem in powdered activated carbon membrane biological reactors testing.

Although the use of granular activated carbon in place of powdered activated carbon does not use carbon as efficiently on a weight basis, the suspended media membrane biological reactor system and a separation subsystem substantially prevents the granular activated carbon from entering the membrane operating system thereby minimizing or eliminating the likelihood of abrasion and fouling of the membranes. The impact of the reduced adsorption efficiency as a result of using granular activated carbon in place of powdered activated carbon does not, however, significantly impact the efficacy of the overall activated carbon-enhanced membrane biological reactor apparatus.

Testing has indicated that the principal mechanism of removal of certain biologically inhibitory organics and/or biologically refractory compounds is related to an increase in the residence time that the biologically refractory and biologically inhibitory compounds are exposed to the micro-organisms in the powdered activated carbon enhanced apparatus. Micro-organisms in the mixed liquor volatile suspended solids adsorbed on the adsorbent material such as granular activated carbon have a longer period of time to digest these certain biologically refractory and biologically inhibitory compounds. Increased residence time for biodegradation has been shown to be a major factor in reducing the concentration of certain biologically refractory and biologically inhibitory compounds in the membrane biological reactor effluent, and the higher adsorption efficiency of the powdered activated carbon is not required to achieve the desired results.

Granular activated carbon in a carbon-assisted membrane biological reactor performs as well or better than a powdered activated carbon enhanced membrane biological reactor in enhancing the removal of biologically refractory compounds, biologically inhibitory compounds, compounds that are entirely resistant to biological decomposition, and extra-cellular polymeric compounds by allowing for substantial regeneration of the granular activated carbon. Also, because of its larger size, it can be effectively filtered or otherwise separated from the mixed liquor that enters the membrane operating system tank(s). The abrasion that occurs when using the powdered activated carbon can be eliminated or significantly reduced by employing granular activated carbon in the suspended medial membrane biological reactor system.

While the use of the powdered activated carbon particles in a membrane biological reactor has demonstrated some of the same advantages described above for the granular activated carbon system, the observed membrane abrasion from the powdered activated carbon particles in the membrane operating system tank(s) is unacceptable since the membrane's useful life can be reduced to an unacceptable level, e.g., significantly less than a typical life expectancy of a membrane. Since the cost of the membranes represents a significant portion of the total cost of a membrane biological reactor system, an extension of their useful life is an important factor in the operating cost of the membrane operating system.

FIGS. 3-6 depict certain embodiments of the wastewater treatment system of the present invention. As noted above, the wastewater treatment system of the present invention can employ a suspended media membrane biological reactor system described with reference to FIGS. 1 and 2 and also described in PCT application number PCT/US10/38644 and Publication Number WO/09085252. While certain preferred embodiments are described in conjunction with treatment of low concentration wastewater, e.g., derived from effluent subjected to upstream wastewater treatment, it will be appreciated by one having ordinary skill in the art, having the benefit of the present disclosure, that the wastewater treatment system of the present invention can advantageously be employed to treat wastewater having some level of biologically labile compounds as well as compounds entirely resistant to biodecomposition, biologically inhibitory compounds, and/or biologically refractory compounds, or a combination of these.

Figure 3:
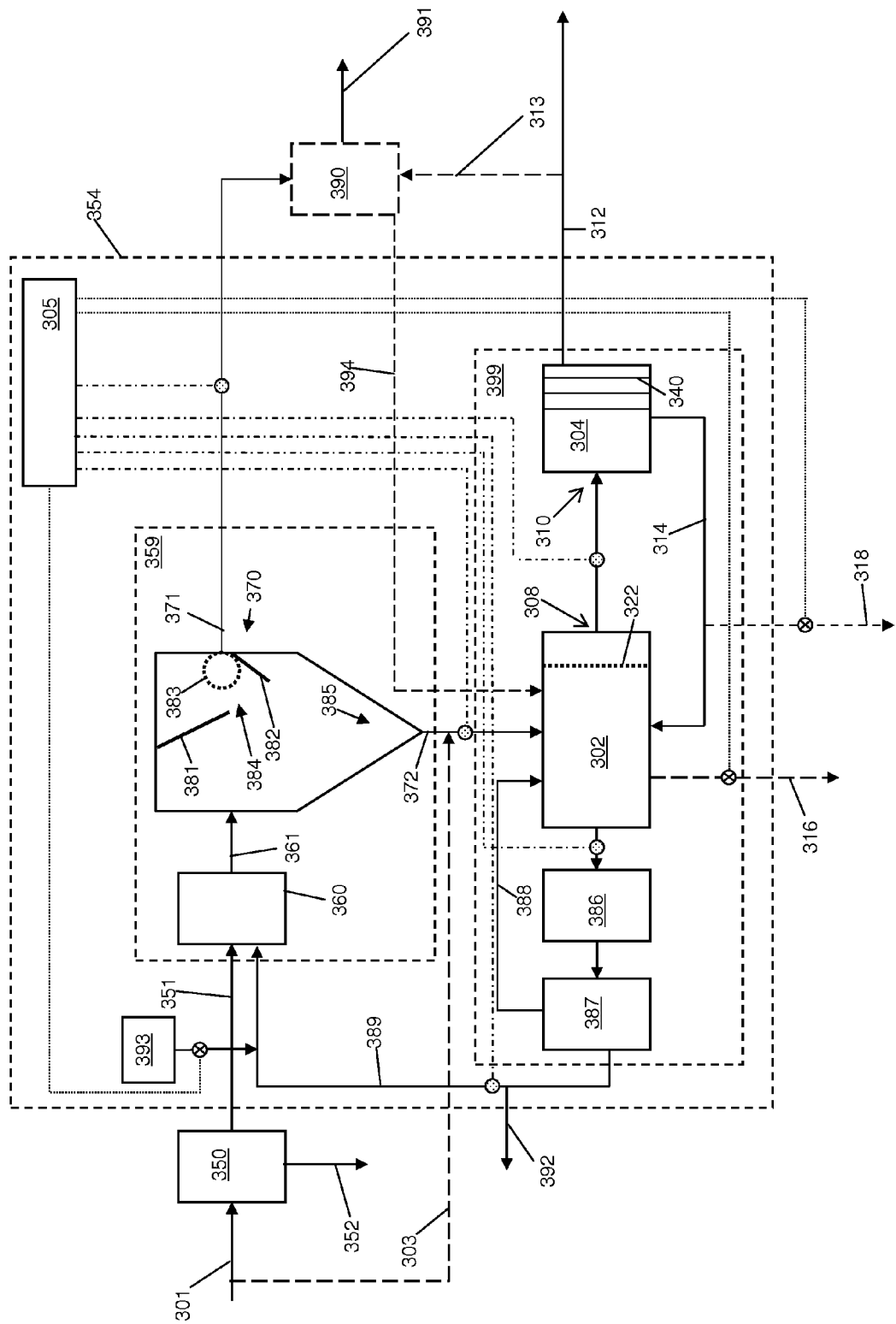
FIG. 3 is a schematic diagram of a wastewater treatment system including an embodiment of a high flux adsorbent material treatment system having a mixing zone and an adsorbent material settling and liquid decanting zone that is integrated with a low flux adsorbent material biological regeneration reactor having a biological regeneration reactor and a membrane operating system.

Referring to FIG. 3, a treatment system 354 is schematically shown for treating effluent 351 from one or more upstream wastewater treatment stages, collectively identified as wastewater treatment system 350. Wastewater treatment system 350 typically treats an influent 301 and discharges excess activated sludge 352 and a liquid treated effluent 351 that is referred to herein as "low concentration wastewater" or "effluent subjected to upstream wastewater treatment", as is conventionally known. While the description which follows refers to effluent 351 as being derived from one or more upstream wastewater treatment stages, e.g., primary and/or secondary, it will be understood by one of ordinary skill in the art that the systems and methods of the present invention are also effective for treating low concentration wastewater from other sources, such as directly from a process having low levels of suspended solids and relatively low levels of dissolved organics. In addition, the wastewater treatment system of the present invention can advantageously be employed to treat wastewater having some level of biologically labile compounds as well as compounds entirely resistant to bio-decomposition, biologically inhibitory compounds, and/or biologically refractory compounds, or a combination of these. In these embodiments, stream 351 can be a direct influent, or subject to minimal upstream processing, such as a primary separation system in which substantially all solids have been removed.

As discussed above, tertiary treatment of an effluent from a secondary treatment zone commonly includes passing the entire secondary effluent through one or more granular activated carbon columns or other tertiary system for additional treatment, e.g., polishing, in order to achieve the required water quality standards. In contrast, treatment system 354 of the present invention, which can be used as a tertiary treatment system, employs a combination of a high flux adsorbent material system 359 to adsorb a substantial amount of contaminants, and a further system 399 for biologically treating adsorbed contaminants, i.e., contaminants adsorbed on the adsorbent material, by biological regeneration and/or reactivation.

In general terms, the treatment system 354 of the present invention comprehends a high flux adsorbent material treatment system 359 and a low flux adsorbent material biological regeneration reactor system 399. The high flux adsorbent material treatment system 359 includes a mixing zone 360 for receiving fresh and/or recycled adsorbent material, e.g., from a source 393 of adsorbent material. Mixing zone 360 is in fluid communication with a source of low concentration wastewater 351 such as effluent subjected to upstream wastewater treatment or other low concentration wastewater. Mixing zone 360 intimately mixes the adsorbent material and wastewater, and passes the mixture of low concentration wastewater and adsorbent material 361 to an adsorbent material settling and liquid separation zone 370. A major portion of the overall liquid volume/flux is decanted or otherwise discharged from the adsorbent material settling and liquid separation zone 370 as effluent 371, which can optionally be subject to further tertiary treatment 390. The adsorbent material is removed from the adsorbent material settling and liquid separation zone 370 as an adsorbent material effluent discharge 372 which is passed to the low flux adsorbent material biological regeneration reactor system 399, which includes a biological regeneration reactor 302, a membrane operating system 304, an adsorbent material shearing zone 386 and an adsorbent material/biomass separation zone 387. In aerobic systems, the biological regeneration reactor 302 further includes a source of oxygen, and micro-organisms biologically oxidize organics and certain inorganics adsorbed on the adsorbent material in the biological regeneration reactor 302, and mixed liquor including mixed liquor volatile suspended solids is passed through an adsorbent solids separation apparatus 322 and discharged as biological regeneration reactor mixed liquor effluent 308 outlet to a solids separation apparatus to remove biomass and any other solids in the mixed liquor. For example, in certain embodiments of the present invention, the solids separation apparatus includes membrane operating system 304, in which the biological regeneration reactor effluent 308 is passed to an inlet 310 of the membrane operating system 304 to remove biomass and any other solids in the mixed liquor. Membrane-treated effluent 312 is discharged as permeate, and activated sludge 314, as retentate, is returned to the biological regeneration reactor 302. A portion of the activated sludge can be discharged from the system via a waste line 318. Adsorbent material from the biological regeneration reactor 302 is passed to the adsorbent material shearing zone 386, in which excess biomass is sheared from the granules or particles of adsorbent material. Biomass is separated from the adsorbent material in the adsorbent material/biomass separation zone 387. Separated adsorbent material that has been regenerated via biological regeneration reactor 302 and subsequently sheared and separated in zones 386 and 387 is recycled via recycle line 389 to the mixing zone 360, and biomass is returned via 388 to the biological regeneration reactor 302. Spent adsorbent material can be removed from the biological regeneration reactor 302, via line 316, or from the adsorbent material/biomass separation zone 387 via line 392.

In certain embodiments, the functions of the adsorbent material shearing zone 386 and an adsorbent material/biomass separation zone 387 can be integrated in a single unit operation. Examples of apparatus that can perform shearing and biomass separation include continuous backwash filters and/or walnut shell filter. In additional embodiments, some or all of the functionality of the adsorbent material shearing zone 386 and an adsorbent material/biomass separation zone 387 can be accomplished in the biological regeneration reactor 302, for instance if biological regeneration reactor 302 is suitably equipped with sufficient turbulence to promote the necessary shearing. In these embodiments, the biomass can remain in the biological regeneration reactor 302, and the regenerated, sheared and separated adsorbent material can be passed directly to the mixing zone 360.

In addition, adsorbent material can be introduced at various locations in the system. For instance, a source 393 can be used to introduce fresh or regenerated adsorbent material via line 389, e.g., mixed with recycled adsorbent material that is returned to mixing zone 360. Other suitable locations can be used for introducing adsorbent material, for instance, as discussed in with reference to FIG. 2, directly into mixing zone 360, or directly into liquid separation zone 370.

In certain embodiments, the adsorbent material effluent stream 372 is lacking in sufficient nutrients to support the biology within biological regeneration reactor 302. Accordingly, a portion of the raw wastewater from influent 301 can be introduced into the biological regeneration reactor 302, for instance via a bypass stream 303. This stream 303 can be intermittent, or continuous, depending on the type of wastewater, its constituents, and whether or not the wastewater composition changes over time. Adding this raw wastewater or some other simple carbon source can enhance the development of bacteria that is required for optimal degradation of refractory organics that are removed from low concentration wastewater stream 351 by the adsorbent material. The raw wastewater initially provides bacteria that become acclimated to the raw wastewater feed constituents, and these bacteria then provide a starting point for bacteria that can biologically degrade the refractory organics. The initial bacteria can evolve over time into species that can digest the refractory organics. Having an untreated wastewater stream feeding the organisms in biological regeneration reactor 302 will result in a bacteria population that is capable of digesting more complex organic compounds than the bacterial that would be present in a sanitary wastewater treatment system, which is generally the most common starting point for bacteria in a wastewater treatment system. Alternatively, or in combination, seed cultures can be added to the biological regeneration reactor 302. Periodically, additional seed culture of the same or a different type can be added, for instance, if the bacteria population decreases due to an upstream event or thermal shock, or if the wastewater contaminants change.

Influent low concentration wastewaters can be deficient in certain nutrients beneficial to the biology that occurs in the biological regeneration reactor 302. Further, certain influent wastewaters have pH levels that are excessively acidic or caustic. Accordingly, as will be apparent to a person having ordinary skill in the art, phosphorus, nitrogen, and pH adjustment chemicals can be added to maintain optimal nutrient ratios and pH levels for the biological life and associated activity, including biological oxidation, in the biological regeneration reactor 302. Additionally, in certain embodiments, a stream of simple carbon compounds can be added to increase the rate of biodegradation of the adsorbed contaminants.

In particular, low concentration wastewater is introduced to the mixing zone 360, which is supplied with adsorbent material, such as granular activated carbon. The adsorbent material can include fresh adsorbent material and/or adsorbent material recycled from within the system, i.e., from the adsorbent material/biomass separation zone 387. The low concentration wastewater and adsorbent material is intimately mixed in mixing zone 360, and at least a portion of the dissolved organics and/or inorganics which were present in effluent 351 are adsorbed on the adsorbent material, i.e., on the outer surface, on the pore wall surfaces, or both.

A mixed stream 361 from the mixing zone 360, including adsorbent material that has adsorbed at least a portion of the organics and/or inorganics from the effluent 351, is then passed to the adsorbent material settling and liquid separation zone 370, e.g., in the form of a slurry. If organics and/or inorganics remain in the liquid portion of the mixture 361, adsorption can continue in the adsorbent material settling and liquid separation zone 370, depending on the flow rate, settling rate, adsorptive capacity of the adsorptive material, and other factors. Preferably, a substantial amount of contaminants are removed so that the remaining liquid portion, decanted or otherwise removed as a high flux adsorbent material effluent stream 371, at least meets levels mandated by the relevant regulatory bodies, and can be recycled or discharged in an environmentally friendly manner. If necessary, stream 371 can be passed to a tertiary treatment zone 390 for final polishing, and the polished effluent 391 discharged. Advantageously, the organics and/or inorganics removed from stream 371 (i.e., as compared to the effluent 351 from wastewater treatment system 350) are adsorbed on the adsorbent material, and stream 371 represents a major portion of the liquid volume of the initial low concentration wastewater stream presented to system 354, e.g., stream 351. In certain embodiments, the flux of stream 371 is at least 90% of the flux of stream 351; in other embodiments, the flux of stream 371 is at least 95% of the flux of stream 351; in additional embodiments, the flux of stream 371 is at least 99% of the flux of stream 351; in further embodiments, the flux of stream 371 is at least 99.9% of the flux of stream 351; and in still further embodiments, the flux of stream 371 is at least 99.99% of the flux of stream 351. The proportion of stream 371 relative to stream 351 can depend on various factors, including the level of initial contamination, the degree of mixing in the mixing zone 360, the volume, configuration and residence time within the adsorbent material settling and liquid separation zone 370, the adsorptive capacity of the adsorbent material, and/or other factors.

In one embodiment, the adsorbent material settling and liquid separation zone 370 includes a vessel configured with an inverse conical or frusto-conical bottom portion 385. Accordingly, adsorbent material is removed by gravity settling through a discharge port at the bottom of the vessel, along with a minor portion of water from the influent stream 351. In addition, in embodiments in which organics and/or inorganics are not sufficiently adsorbed in the mixing zone 360, the adsorbent material settling and liquid separation zone 370 can be suitably dimensioned to provide additional contact time between the thus-treated wastewater effluent and the adsorbent material. In certain embodiments of the adsorbent material settling and liquid separation zone 370, this can be accomplished with a vessel providing a low concentration wastewater residence time of greater than about 5 minutes, and in certain embodiments having a residence time of greater than about 15 minutes. Of course, one of ordinary skill in the art, having the benefit of the teachings herein, will appreciate that the time required to separate the adsorbent from the effluent will depend on a variety of factors, including but not limited to the density of the adsorbent material, the density of the wastewater, and the geometry of the tank.

The adsorbent material settling and liquid separation zone 370 can preferably include a separation subsystem for preventing adsorbent material from exiting the adsorbent material settling and liquid decanting zone with the high flow of liquid effluent 371. In certain embodiments, the separation subsystem can comprise a quiescent zone 384, e.g., formed by baffles 381 and 382. This permits a substantial amount of the adsorbent material present in the adsorbent material settling and liquid separation zone 370 to be directed towards the inverse conical or frusto-conical bottom portion 385. In additional embodiments, the separation subsystem can comprise a screening apparatus 383 proximate the outlet of the adsorbent material settling and liquid separation zone 370. The screening apparatus 383 can be a stationary screen, a moving screen, a wedge wire screen, a rotary drum screen, or other suitable screen type. In further embodiments, the separation subsystem can comprise both the quiescent zone 384 and the screening apparatus 383. In still further embodiments, the separation subsystem can include a quiescent zone and a weir located at the liquid effluent 371 outlet of the adsorbent material settling and liquid separation zone 370. Note that the separation subsystem used in the adsorbent material settling and liquid decanting zone 370 can be the same or different than the separation subsystem used in biological regeneration reactor 302 including one or more of a screening system, a settling zone, or a combination thereof. In addition, if further solids removal from the effluent 371 is required, a clarifier, filter, or other separation device can be included in fluid communication downstream of the effluent 371 outlet of the adsorbent material settling and liquid separation zone 370.

For instance, the separation subsystem within the adsorbent material settling and liquid separation zone 370 can be eliminated in embodiments in which the adsorbent material has a relatively high specific gravity (e.g., greater than about 1.10 in water at 20° C., in certain embodiments greater than about 1.40 in water at 20° C., and in additional embodiments having a specific gravity of up to about 2.65 in water at 20° C.), whereby high settling rates, in combination with suitable dimensions and configurations of the adsorbent material settling and liquid decanting zone 370, including the geometry of the bottom portion 385 and the position of the effluent 371 outlet. In these embodiments, a clarifier, filter, or other separation device can be provided downstream of the adsorbent material settling and liquid separation zone 370. Alternatively, a clarifier, filter, or other separation device can also be eliminated in embodiments in which the effluent 371 is subjected to a final polishing apparatus 390. In certain embodiments, if the final polishing apparatus 390 is a fixed bed granular activated carbon adsorption column, any excess adsorbent material from the adsorbent material settling and liquid decanting zone 370 that may pass with effluent 371 will not impact the final effluent as it will be trapped in the polishing apparatus 390.

Adsorbent material passes from the adsorbent material settling and liquid separation zone 370 to a biological regeneration reactor in which micro-organisms biologically degrade organics and certain inorganics adsorbed on the adsorbent material.

In certain embodiments, the biological regeneration reactor 302 is an aerobic system, in which the micro-organisms are aerobic and the biological regeneration reactor 302 is an aeration tank, including a source of oxygen (not shown), for instance, one or more diffusers, jet suspension apparatus, or gas lift suspension systems, as described in PCT application number PCT/US10/38644, and the biological degradation includes biological oxidation. The biology within the biological regeneration reactor is discussed in greater detail in PCT application number PCT/US10/38644, and in PCT Publication Number WO/09085252.

In additional embodiments, the biological regeneration reactor 302 is an anaerobic system, in which the micro-organisms are anaerobic.

Mixed liquor, including mixed liquor volatile suspended solids, is discharged, through a separation subsystem 322 in or downstream of the biological rector 302, and passed from an outlet 308 of the biological rector 302 to the membrane operating system 304 through an inlet 310. The membrane operating system 304 contains one or more membranes 340. Membrane-treated effluent 312 is discharged as permeate, and activated sludge 314 as retentate is returned to the biological regeneration reactor 302. Optionally, activated sludge waste can be discharged from the return activated sludge line 314 via a waste line 318. In addition, an optional adsorbent material waste line 316 (as indicated by a long-dash line) can remove spent adsorbent material that has lost its efficacy, or be used to periodically remove adsorbent material, as described in conjunction with FIG. 2 and in PCT Publication Number WO/09085252 and in PCT application number PCT/US10/38644. Preferably, removed spent adsorbent material is replenished with equivalent amounts of fresh or regenerated adsorbent material. In additional optional embodiments, all or a portion of membrane treated effluent 312 can be passed via optional line 313 (as indicated by a long-dash line) to a tertiary treatment zone 390 for final polishing.

The adsorbent material, such as granular activated carbon, and any entrained liquid in stream 372 that passes into the biological regeneration reactor 302 is treated in a similar manner as the membrane biological reactor systems described in PCT application number PCT/US10/38644 and in PCT Publication Number WO/09085252. However, the flux of stream 372 is relatively low. For instance, the flux of stream 372 can be less than about 10%, 5%, 1%, 0.1% or even less than about 0.001% of the flux of stream 351. In certain embodiments, the flux is the minimum flow that can be passed through the membrane operating system 304 without impacting the activity of the micro-organisms in the biological regeneration reactor 302. Alternatively, this system can be operated as a sequencing batch reactor, in which the effluent is discharged when the wastewater has been adequately treated. In addition, in certain embodiments, the biological regeneration reactor 302 can be an aeration tank incorporating a combination of jet suspension or gas lift suspension, a quiescent zone and a wedge wire screen as is described in PCT application number PCT/US10/38644. The membrane operating system 304 in the low concentration wastewater treatment system 354 of the present invention operates in a similar manner as the membrane biological reactors described in PCT application number PCT/US10/38644 and in PCT Publication Number WO/09085252, however, operating at a very low flow rate. As biomass builds up in this system, it can be wasted in a manner similar to conventional membrane biological reactor systems, e.g., through a return activated sludge waste line 318. An adsorbent material waste line 316 is also provided. For instance, the adsorbent material can lose its adsorption capacity in conditions where the effluent subjected to upstream wastewater treatment contains inorganics or biologically inhibitory compounds that are not oxidized even with the substantially increased residence time using the low concentration wastewater treatment system of the present invention. Adsorbent material can be replaced in the system, e.g., using one or more of the adsorbent material input locations described in PCT Publication Number WO/09085252, or in another suitable location, or source 393.

On a continuous or intermittent basis, a side stream including adsorbent material, and optionally mixed liquor to provide a liquid carrier for the adsorbent material that facilitates transfer (e.g., in the form of a slurry), is removed from the biological regeneration reactor 302 and passed to shearing zone 386. In the shearing zone 386, excess biomass is sheared from the outer surfaces of the adsorbent material, such that the adsorption capacity of the adsorbent material in mixing zone 360 and/or the adsorbent material settling and liquid separation zone 370 is maximized. The shearing zone 386 can include one or more of a pump, a jet nozzle, an aerated grit chamber, a mechanical mixer, centrifugal devices such as a hydrocyclone or centrifuge, or other apparatus that facilitates collision to effectuate shearing and in certain embodiments promote separation of biomass from adsorbent material. The turbulence, inter-granule collisions, and collisions with other solid objects (stationary or moving) of the shearing zone and in certain embodiments, piping between the shearing zone and the biological regeneration reactor 302, can result in shearing of excess biomass from the outer surface of the adsorbent material and become free floating mixed liquor suspended solids including mixed liquor volatile suspended solids.

In addition, the action of the fluid circulation, including high velocity liquid and/or gas contacting surfaces of the adsorbent material having excess biomass contributes to the desired shearing.

In certain embodiments, the adsorbent material shearing zone 386 can comprise continuous regenerating system, for instance, having the configuration of a walnut shell filter or other similar unit operation, e.g., without the walnut shell media, for instance, of the type that is commercially available from Siemens Water Technologies. For instance, as the adsorbent material is passed through the continuous regenerating system such as a continuous backwash filter or a walnut shell filter, inter-granule collisions and collisions with other solid objects and/or surfaces in the continuous regenerating system causes shearing of excess biomass from the granules of adsorbent material.

The slurry including sheared adsorbent material, free biomass sheared from the adsorbent material, and any mixed liquor is passed to an adsorbent material/biomass separation zone 387 to separate mixed liquor suspended solids biomass sheared from the adsorbent material from the more dense adsorbent material. The adsorbent material/biomass separation zone 387 can include one or more of a hydrocyclone separator, a centrifuge, a side stream off of the continuous regenerating system, or other device suitable to separate adsorbent material from the biomass.

Note that in certain embodiments in which the biological regeneration reactor 302 includes jet nozzles or other apparatus that effectuates shearing within the biological regeneration reactor 302 as described in PCT application number PCT/US10/38644, shearing zone 386 can be eliminated or bypassed, whereby a side stream from the biological regeneration reactor 302 is passed directly to the adsorption/biomass separation zone 387.

The separated adsorbent material from the adsorbent material/biomass separation zone 387 is passed to the mixing zone 360 via a line 389. The adsorbent material returned to the mixing zone 360 contains a reduced concentration of microorganisms, and thus the organics in the low concentration wastewater can be adsorbed and exposed to the desired biology in the mixing zone 360 and in the adsorbent material settling and liquid separation zone 370, prior to passage into the biological regeneration reactor 302.

Sheared biomass, which can include mixed liquid having mixed liquor suspended solids and mixed liquor volatile suspended solids, from the adsorbent material/biomass separation zone 387, is passed to the biological regeneration reactor 302 via a line 388.

In alternative embodiments, mixed liquor from the adsorbent material/biomass separation zone 387 can be transferred downstream from the separation subsystem 322 of the biological regeneration reactor 302, for instance, combined with effluent 308, or passed directly into the membrane operating system. Notably, the separation requirements of separation subsystem 322 can be reduced or obviated in this alternative embodiment, as mixed liquor can be transferred without the need for further separation. In certain embodiments, a source of mixed liquor for the membrane operating system 304 (or clarifier/settling tank 395 described in connection with FIG. 3) can be the liquid effluent from the adsorbent material/biomass separation zone 387.

In certain preferred embodiments, in order to facilitate settling of the adsorbent material in the adsorbent material settling and liquid separation zone 370, granular activated carbon having relatively high specific gravity levels is employed. For instance, granular activated carbon having a specific gravity greater than 1.10 can be used. In further embodiments, granular activated carbon having a specific gravity greater than 1.40 can be used. Since the flow rate of the mixture containing granular activated carbon is relatively low, and the biological regeneration reactor 302 and membrane operating system 304 are relatively small, the higher energy requirements to maintain the denser adsorbent material in suspension for a period of time sufficient to cause the desired level of biology within the biological regeneration reactor 302 are not a significant factor in the overall energy requirements of operating the system.

Certain low concentration wastewater influents can include inorganic compounds not capable of being degraded by the microorganisms. The levels of these inorganics must typically be reduced to within mandated regulatory requirements. The adsorbent material can be modified with a treatment process and/or species thereby providing an affinity to certain chemical species and/or metals in the wastewater, for instance, by impregnating suitable compounds, as further described in PCT application number PCT/US10/38644. As the micro-organisms in the low concentration wastewater treatment system of the present invention cannot remove these inorganic compounds as effectively as they can remove organic compounds, systems using adsorbent material to adsorb inorganic contaminants generally require more frequent replacement of adsorbent material as compared to systems treating only organic compounds. The spent adsorbent material is removed from the system as it approaches the adsorption limit for each compound to be removed from the low concentration wastewater. For instance, sampling and analysis or online monitoring can be performed periodically or continuously to determine the organic or inorganic concentration from the low concentration wastewater treatment system of the present invention, as the adsorption capacity of granular activated carbon for various compounds is inversely related to the waste concentrations in effluent 371.

In an additional embodiment in which a tertiary treatment system 390 is employed and includes a conventional adsorbent material filtration system, contaminated adsorbent material from system 390 can be regenerated and/or reactivated using the adsorbent material biological regeneration reactor system 399, as indicated by line 394 between the tertiary treatment system 390 and the biological regeneration reactor 302. Certain existing granular activated carbon adsorbent filter systems use staged adsorption, in which fresh granular activated carbon is added in the final downstream filter, and the partially loaded granular activated carbon is used in the upstream filter(s). In embodiments of the present invention in which contaminated adsorbent material from system 390 is regenerated and/or reactivated using the adsorbent material biological regeneration reactor system 399, the partially loaded granular activated carbon is transferred to the biological regeneration reactor 302 for regeneration and reuse as all or a portion of the adsorbent material in the mixing zone 360. Although line 394 is shown as transferring partially loaded adsorbent material directly to the biological regeneration reactor 302, one of ordinary skill in the art, having the benefit of the teachings herein, will appreciate that this partially loaded adsorbent material can be introduced in the adsorbent material shearing zone 386, the adsorbent material/biomass separation zone 387, the source 393 of adsorbent material, the mixing zone 360, or the liquid separation zone 370.

In some embodiments, one or more sensors can be included at locations throughout the system 350, including within the high flux adsorbent material treatment system 359 and the low flux adsorbent material biological regeneration reactor system 399. These sensors can be employed with a manually controlled and operated system or an automated control system to implement a suitable process modification in a programmable logic controlled wastewater treatment system. In one embodiment, system 350 (or the high flux adsorbent material treatment system 359 and the low flux adsorbent material biological regeneration reactor system 399) includes a controller 305 which can be any suitable programmed or dedicated computer system, PLC, or distributed control system. The concentration of certain organic and/or inorganic compounds can be monitored and measured by a sensor or sensors in fluid communication with effluent 312 or the effluent from outlet 308 of the biological regeneration reactor 302, as indicated by dash-dot line connections between the controller 305 and both the effluent line 312 and the intermediate effluent line between outlet 308 and inlet 310. In another embodiment, the concentration of volatile organic compounds or other property or characteristic of the system can be measured at one or more of inlets 301, 351, or 310. In additional embodiments, concentration of certain organic and/or inorganic compounds can be monitored and measured by a sensor or sensors in fluid communication with effluent 371 of the adsorbent material settling and liquid separation zone 370, as indicated by dash-dot line connections between the controller 305 and the effluent line 371. Sensors known to those of ordinary skill in the art of process control apparatus can include those based on laser-induced fluorescence or any other sensor suitable for in situ real time monitoring of the concentration of organic or inorganic compounds in the effluent or other property or characteristic of the system. Sensors that can be used include submersible sensors for use in oil-in-water measurement which use UV fluorescence for detection, such as enviroFlu-HC sensors available from TriOS Optical Sensors (Oldenburg, Germany). The sensors can comprise lenses which are coated or otherwise treated to prevent or limit the amount of fouling or film that occurs on the lenses. When one or more sensors in the system generate a signal that the concentration of one or more organic and/or inorganic compounds exceeds a predetermined concentration, the control system can implement a responsive action such as a suitable feedback action or feedforward action, including but not limited to removing adsorbent material via waste discharge port 316 (as indicated by dotted line connections between the controller 305 and the valve associated with the waste discharge port 316); removing return activated sludge via a waste line 318 (as indicated by dotted line connections between the controller 305 and the valve associated with the waste discharge port 318); adding new or regenerated adsorbent material via adsorbent material source 393 or at one of the other locations (as indicated by dotted line connections between the controller 305 and the valve associated with the adsorbent material source 393); adding a different type of adsorbent material; modifying the hydraulic retention time; modifying the biological characteristics such as simple carbon food for micro-organisms or adding phosphorus, nitrogen and/or pH adjustment chemicals; and/or other modifications as described above or that will be apparent to those of ordinary skill in the art.

In additional embodiments, the condition of the slurry containing adsorbent material can be characterized by one or more sensors (indicated in FIG. 3 with a shaded circle), such as optical sensors and/or UV fluorescence sensors. For instance, one or more sensors can be associated with the adsorbent material effluent stream 372, as indicated by dash-dot line connections between the controller 305 and the stream 372, to measure the concentration of one or more compounds in the stream and/or to determine the quality of the adsorbent material in the slurry. Further, one or more sensors can be associated with the adsorbent material effluent stream from the biological regeneration reactor, as indicated by dash-dot line connections between the controller 305 and the line between the biological regeneration reactor and the adsorbent material shearing zone 386, and/or one or more sensors can be associated with the adsorbent material recycle line 389, as indicated by dash-dot line connections between the controller 305 and the recycle line 389. In the event that it is determined, based on information from one or more of these sensors and/or other sensors or source of information, that the adsorbent material has a reduced adsorptive capacity, appropriate feedback or feedforward action can be actioned.

Figure 4:
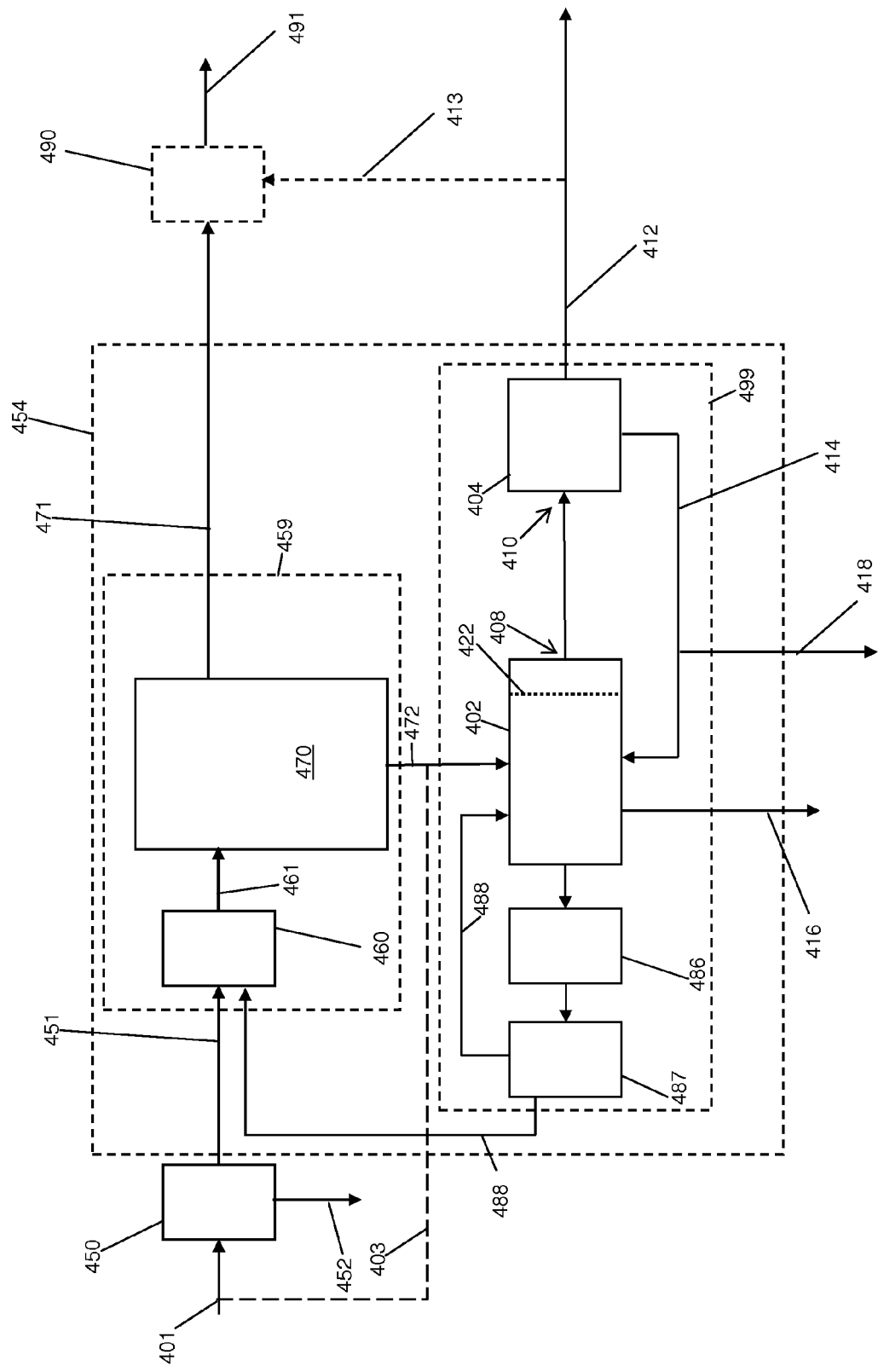
FIG. 4 is a schematic diagram of a wastewater treatment system including a high flux adsorbent material treatment system having a mixing zone and another embodiment of an adsorbent material settling and liquid separation zone that is integrated with a low flux adsorbent material membrane biological regeneration reactor.

Referring now to FIG. 4, a low concentration wastewater treatment system 454 similar to system 354 shown in FIG. 3 is schematically illustrated. In system 454, an adsorbent material settling and liquid separation zone 470 is provided, which can be one or more centrifuges, hydrocyclones, clarifiers, filters of various types, or other suitable separation devices. The adsorbent material settling and liquid separation zone 470 separates the liquid from the mixed stream 461, containing low concentration wastewater and adsorbent material from the mixing zone 460.

In certain embodiments of the system 454, flow rates within the high flux adsorbent material system 459 are controlled to provide sufficient residence time to allow the requisite level of contaminants from the stream 451 to adsorb onto the adsorbent material such as granular activated carbon, and discharge a stream 471 meeting mandated quality levels for effluent discharge, or at levels of contamination sufficiently low to be conveniently treated in a supplemental tertiary treatment system 490. Other aspects of the low concentration wastewater treatment system 454 are substantially the same as those described with respect to system 354, and similar reference numbers are used in FIG. 4 to represent similar or equivalent components.

Figure 5:
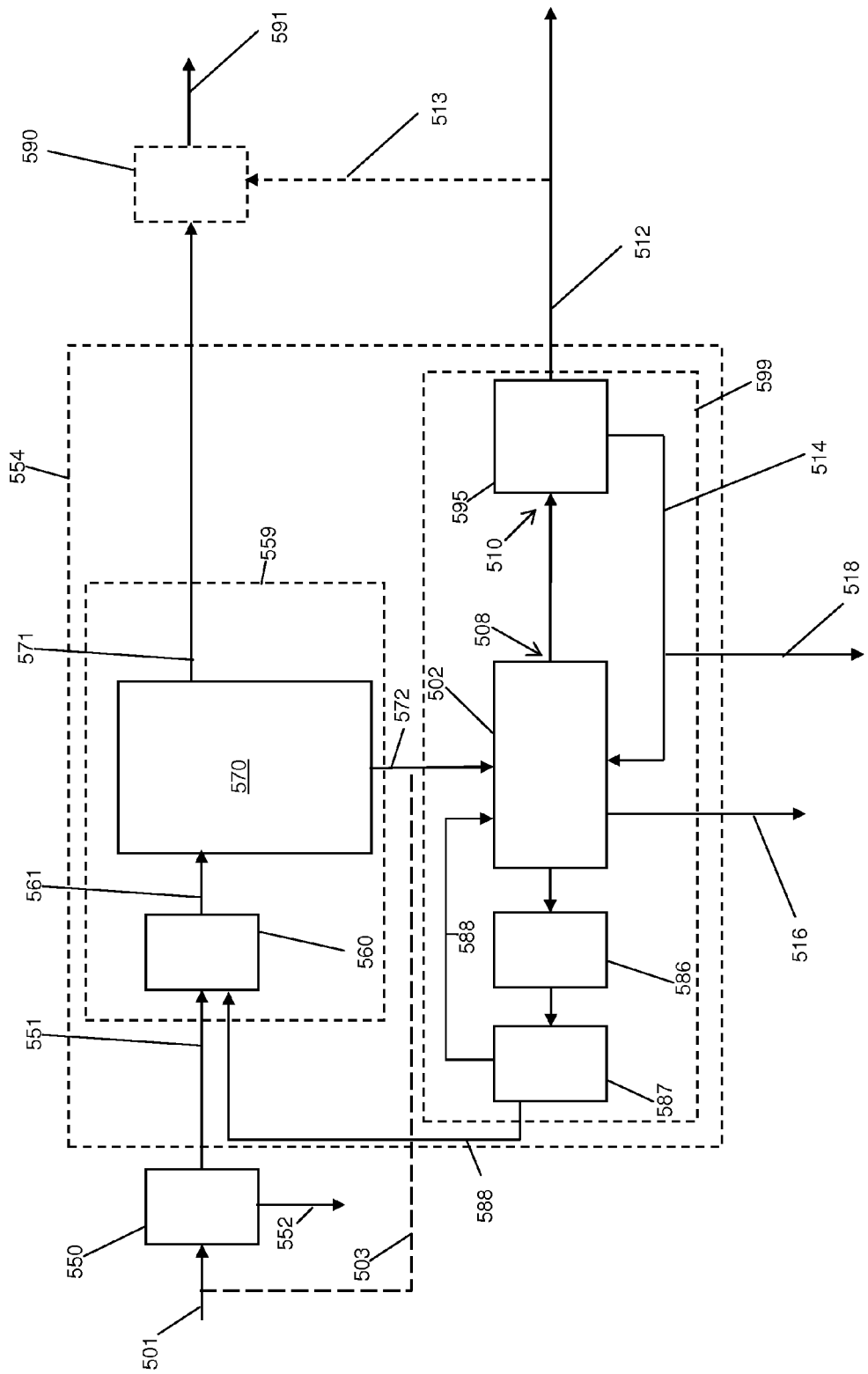
FIG. 5 is a schematic diagram of a wastewater treatment system including a high flux adsorbent material treatment system that is integrated with another embodiment of a low flux adsorbent material biological regeneration reactor.

Referring now to FIG. 5, a low concentration wastewater treatment system 554 is schematically illustrated similar to system 454 shown in FIG. 4, wherein a low flux adsorbent material biological regeneration reactor regeneration system 599 includes a biological reactor system other than a membrane operating system. In particular, the low flux adsorbent material biological regeneration reactor system 599 includes a biological regeneration reactor 502, an adsorbent material shearing zone 586, adsorbent material/biomass separation zone 587, and a clarifier/settling apparatus 595 as a solids separation apparatus. The clarifier/settling apparatus 595 can be either a clarifier apparatus, a settling apparatus, or an apparatus that performs both clarification and settling. The system operates in a manner similar to system 354, but without the membrane operating system 304. Rather, to remove biomass and any other solids in the mixed liquor, a clarifier/settling apparatus 595 is used. In particular, clarifier/settling apparatus 595 allows activated sludge to settle, and it is returned to the biological rector 502 via a return activated sludge line 514. Clarified liquid is passed as effluent 512. The clarifier/settling tank 595 can be substituted in any of the systems described with reference to FIGS. 3, 4 and/or 6. Other aspects of the low concentration wastewater treatment system 554 are substantially the same as those described in connection with system 354, and similar reference numbers are used in FIG. 5 to represent similar or equivalent components.

Figure 6:
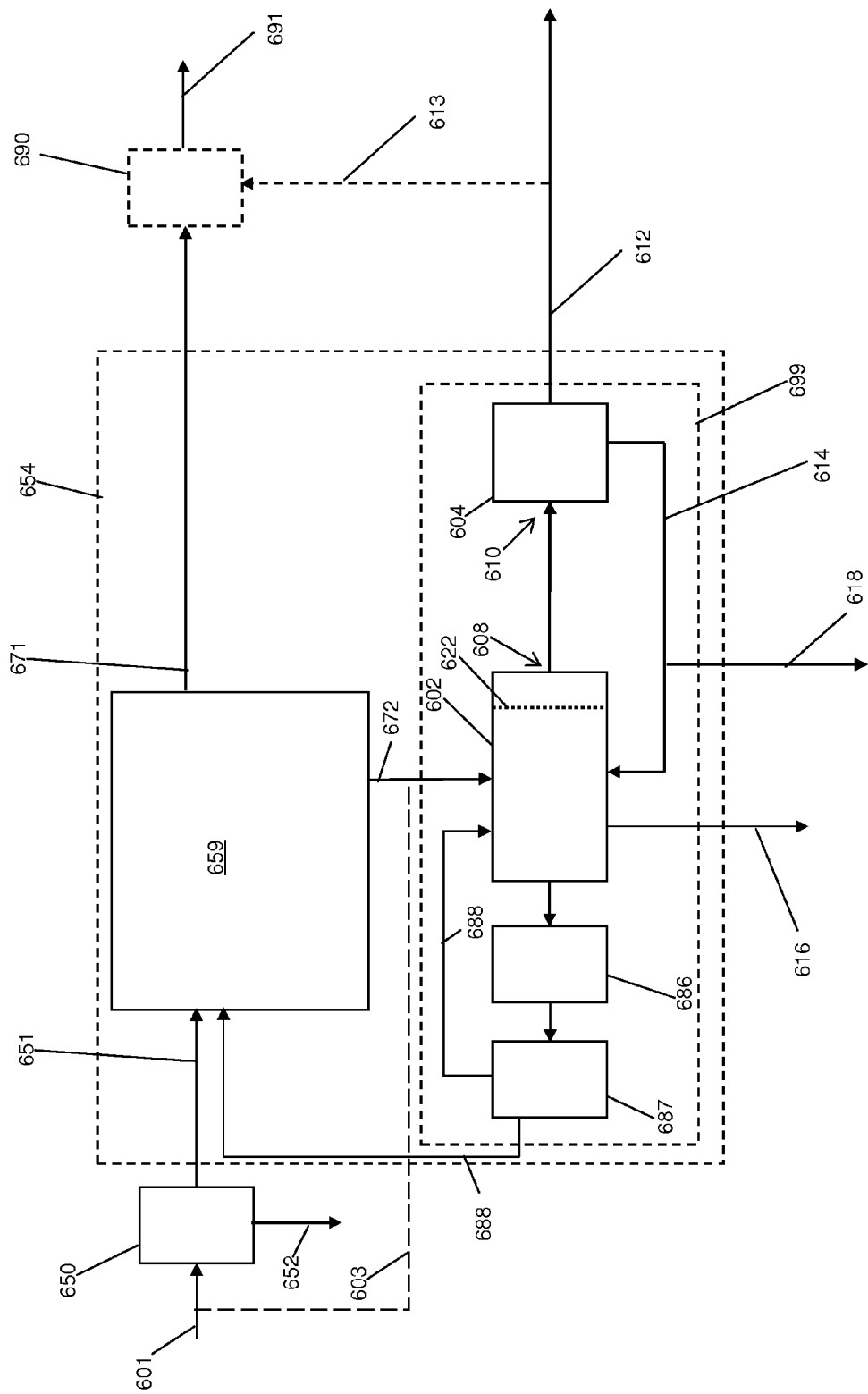
FIG. 6 is a schematic diagram of a wastewater treatment system including a further embodiment of a high flux adsorbent material treatment system that is integrated with a low flux adsorbent material biological regeneration reactor.

Referring now to FIG. 6, a low concentration wastewater treatment system 654 is schematically illustrated that is similar to system 354 shown in FIG. 3, in which a high flux adsorbent material system 659 is an integrated mixing/settling unit operation. For instance, in certain embodiments, the high flux adsorbent material system 659 can include a continuous backwash filter or a continuous regenerating filtration system similar to a continuous regenerating walnut shell filter (without the walnut shell media), for instance, of the type that is commercially available from Siemens Water Technologies. Adsorbent material is removed as effluent 672, and the effluent 671 is wastewater that has had contaminants adsorbed therefrom. In certain embodiments, the continuous regenerating system also can perform stripping functions, in combination with, or as an alternative to, an adsorbent material shearing zone 686, and adsorbent material/biomass separation zone 687. Note that in such embodiments, an adsorbent material/biomass separation zone is provided downstream from the continuous backwash high flux adsorbent material system 659. In an additional embodiment, high flux adsorbent material system 659 includes an adsorbent material filtration apparatus such as a conventional tertiary carbon filter, in which treated water is discharged as stream 671, and the partially loaded adsorbent material 672, instead of being treated with conventional hot air or steam regeneration, for instance, is regenerated using the system 699 for biologically treating adsorbed contaminants, which operates in a manner similar to that described with respect to FIG. 3, and regenerated adsorbent material 688 is introduced into the tertiary carbon filter included in the high flux adsorbent material system 659. Other aspects of the low concentration wastewater treatment system 654 are substantially the same as those described in connection with system 354, and similar reference numbers are used in FIG. 6 to represent similar or equivalent components.

In additional embodiments of the present invention, the source of wastewater treated by the a high flux adsorbent material treatment system integrated with a low flux adsorbent material biological regeneration reactor according to the present invention can be from a system that treats primary solids including a portion of the $BOD_5$ compounds by irradiation. In particular, and referring to FIG. 7, a system 700 is shown for treating an influent wastewater stream 701 containing suspended organic solids, dissolved organic solids, and optionally, other contaminates such as inorganics. The influent wastewater stream 701 is introduced into a primary separation system 753, such as a settling zone that allows biological solids to settle, a clarifier, a centrifuge, filter, screen, belt press, vortex separators, flotation devices, or other solids removal systems. In the primary separation system 753, solids and a portion of the easy to degrade biological oxygen demand compounds ($BOD_5$) materials are separated from the wastewater stream.

A typical primary treatment system is usually capable of reducing the $BOD_5$ concentration by about 40% to about 50%, and reducing the total suspended solids concentration by about 60% to about 70%. The solids removed in this step are usually the larger more slowly biodegradable suspended solids and the effluent is typically a mixture of the more volatile, easier-to-treat compounds present in the sanitary wastewater. Additional unit operations can also be used to provide a greater removal efficiency of the undissolved contaminants in the raw wastewater. For instance, one or more centrifuge devices, settling devices, or floatation devices (e.g., dissolved air, induced air flotation) can be used. In further embodiments, additional unit operations can include addition of appropriate chemical compounds to treat to remove at least a portion of the less dense solids present in the raw wastewater.

In certain embodiments, a water phase, typically including dissolved contaminants and a minority portion of suspended solids, can be discharged as a wastewater effluent containing some level of biologically labile compounds or a low concentration wastewater effluent 751, and then treated downstream by a wastewater treatment system 754, which operates, for example, in a manner similar to one or more of systems 354, 454, 554 or 654 described previously. An effluent 712 is discharged that is generally suitable for recycling as process water, irrigation, or environmentally friendly discharge. Untreated biological solids are separated from the primary treatment system 753 as a solid effluent stream 774, typically containing entrained liquids, and are passed, e.g., using a sewage trash pump or progressive cavity pump (not shown) suitable for handling of solid-laden liquids and slurries to a homogenization zone 775, in which the solids are homogenized by a suitable mechanical apparatus such as one or more grinders and/or shredders. The homogenization zone 775 ensures that no compact lumps of solids are introduced into the downstream irradiation/disinfection zone 777, thereby ensuring a maximum level of disinfection.

The untreated homogenized solids 776, generally in a slurry form, are pumped to an irradiation/disinfection zone 777, in which the solids are disinfected using beta-ray, gamma-ray, x-ray or electron beam radiation, for instance, to achieve United States Environmental Protection Agency Class A or B bio-solid disinfection requirements, or mandated sludge disinfection requirements of other jurisdictions. The disinfected solids 778 can thus be disposed of in an environmentally friendly manner.

FIG. 8 shows another embodiment of a wastewater treatment system including irradiation of primary solids that are mixed with an inert material to allow it to be reused as a soil substitute or for other uses. In particular, a system 800 is similar to system 700, with the additional operation of a mixing zone 763, in which disinfected solids 778 are mixed with an inert filler material 762, such as sand, clay, and/or another suitable filler material, to produce a product 764, which can be useful as soil, compost, or fertilizer. The system 800 including providing the product 764 is particularly desirable for treating wastewater having solids not having toxic organic or inorganic compounds.

Optionally, a dewatering zone can be provided in the system 700 or 800. However, in system 800, excess water can be absorbed by sand or other inert material mixed with the disinfected primary solids.

In certain embodiments, the influent wastewater 701 includes a high concentration of metals, other inorganics, or toxic organics. Accordingly, even when disinfected to suitable levels, a mixture of the disinfected bio-solids and filler material is not amenable as a soil, compost or fertilizer product. However, substantial capital cost, energy and size benefits can be attained, even in embodiments in which disinfected materials are disposed of in landfills, for instance, after drying and/or mixing with a suitable inert material.

In certain embodiments of the present invention, a system is configured as a portable system, e.g., mounted on a skid, truck body, trailer, or the like. Portability allows the tertiary treatment system to be manufactured and delivered as a turnkey system. A portable or skid-mounted system will also facilitate the provision of the tertiary system on an as-needed basis, for instance, in situations in which other tertiary treatment systems are in service, under repair or being constructed. Further, certain facilities that are processing chemicals for a short period of time and create a particularly hard-to-treat wastewater stream can benefit from a portable or skid-mounted system according to the present invention. Pipe fittings can be provided that are adapted for mating with standard fittings and ports in existing wastewater treatment plants for ease and rapid installation of the system of the invention.

The system and method of the present invention avoids the problems of the prior art related to treating low concentration wastewater by passing wastewater that has already been subjected to secondary treatment, e.g., effluent from a secondary system, through an adsorbent material mixing zone, wherein adsorbent material and secondary effluent are intimately mixed. Note that the secondary effluent, at the point of passage to the adsorbent material mixing zone, has had substantially all solids and thus the majority of the high $BOD_5$ components removed. Thus, the secondary effluent is not amenable to biological oxidation from a traditional treatment biological system as the wastewater is too low in strength, contains biologically refractory compounds, contains biologically inhibitory compounds, contains inorganic compounds, or a combination of these, which either cannot be oxidized biologically, or requires a much longer residence time than is typically available to biological oxidation. Typically a more energy intensive tertiary system such as granular activated carbon adsorption filters or another tertiary treatment system is used to polish this stream that is no longer treatable by a normal biological oxidation.

The low concentration wastewater treatment system of the present invention allows the contaminants to concentrate onto the carbon and provides for treatment of low strength wastewater or a wastewater with biologically-difficult to treat compounds, including bio-inhibitory and/or biologically refractory compounds. In addition, inorganic compounds present in the low concentration wastewater can be adsorbed.

The low concentration wastewater treatment system of the present invention is a lower cost alternative to the methods currently being used as it utilizes biological oxidation—typically the lowest cost removal technology available for treating wastewater. Activated carbon adsorption columns are typically very expensive to operate and require a very energy intensive process to regenerate carbon, typically based on incineration to regenerate the granular activated carbon. Deployment of the tertiary treatment system of the present invention as a replacement or a supplement to an activated carbon column can produce a considerable energy savings. As a result, carbon credits for carbon dioxide reduction associated with the decreased energy consumption can be earned.

Volumetric capacity requirements for the various operations within the low concentration wastewater treatment system of the present invention can be significantly less than a conventional membrane biological reactor used to treat the same volume of wastewater and is significantly smaller than a conventional sewage treatment system not utilizing membranes.

The use of the low concentration wastewater treatment system of the present invention allows for treatment of a relatively low strength wastewater, essentially only the dissolved contaminants and a small amount of entrained solids in the wastewater, and still results in an effluent having very low concentrations of hard-to-treat (refractory compounds) or simple organic compounds that were originally present in the wastewater. It is noted that certain preferred embodiments are described in conjunction with treatment of low concentration wastewater, and are referred to as "low concentration wastewater treatment systems." Nonetheless, as will be appreciated by one having ordinary skill in the art, having the benefit of the present disclosure, the wastewater treatment system of the present invention can advantageously be employed to treat wastewater having some level of biologically labile compounds as well as compounds entirely resistant to bio-decomposition, biologically inhibitory compounds, and/or biologically refractory compounds, or a combination of these. For instance, dissolvent biologically labile compounds can be adsorbed on the adsorbent material along with compounds entirely resistant to bio-decomposition, biologically inhibitory compounds, and/or biologically refractory compounds, or a combination of these, and passed to the adsorbent material biological regeneration reactor system described herein. The biologically labile compounds can serve as food alone or in combination with a secondary nutrient source to support the micro-organisms.

Useful adsorbent materials for the present invention include various types of carbons, such as activated carbon. In particular, granular activated carbons are very effective, since the size range and densities of the granules can be selected to enable their retention in a predetermined portion of the system and thereby substantially prevent them from fouling and/or abrading the membranes.

In systems in which the granular activated carbon is not subjected to significant shearing forces and/or inter-granule collision, the granular activated carbon can be produced from wood, coconut, bagasse, sawdust, peat, pulp-mill waste, or other cellulose-based materials. One suitable example is MeadWestvaco Nuchar® WV B having nominal mesh sizes of 14×35 (based on the U.S. Standard Sieve Series).

In additional embodiments, particularly those in which shearing action is provided by turbulence and/or inter-granule collisions in a pump and/or jet nozzle, use of adsorbent material(s) having higher hardness values are desirable. For instance, granular activated carbons derived from bitumen or coal-based materials are effective. In a particular embodiment, the granular activated carbon is derived from lignite.

Carbon materials can also be provided which are modified with a treatment process and/or species thereby providing an affinity to certain chemical species and/or metals in the wastewater. For instance, in wastewaters having a relatively high level of mercury, at least a portion of the adsorbent material preferably includes granular activated carbon impregnated with potassium iodide or sulfur. Other treatments and/or impregnated species can be provided to target specific metals, other inorganic compounds and/or organic compounds.

In addition, the adsorbent can be a material other than activated carbon. For instance, iron-based compounds or synthetic resins can be used as the adsorbent materials, alone or in combination with other adsorbent materials, e.g., in combination with granular activated carbon. Further, treated adsorbent materials other than activated carbon that target certain metals, other inorganic compounds or organic compounds can be used. For instance, in wastewaters having relatively high levels of iron and/or manganese, at least a portion of the adsorbent can comprise a granular manganese dioxide filtering media. In wastewaters having arsenic, at least a portion of the adsorbent can comprise granular iron oxide composites. In wastewaters including lead or heavy metals, at least a portion of the adsorbent can include granular alumino-silicate composites.

In one embodiment, the adsorbent material can be selected based upon a desired specific gravity range. In order to maintain the adsorbent material in suspension within acceptable energy consumption/cost ranges, specific gravity ranges relatively close to that of the wastewater are desirable. On the other hand, in embodiments in which separation is based at least in part on rapid settling of the material, higher specific gravities are more suitable. In general, the specific gravity is preferably greater than about 1.05 in water at 20° C. In certain embodiments, the specific gravity is greater than about 1.10 in water at 20° C. A suitable upper limit for the specific gravity is, in certain embodiments, about 2.65 in water at 20° C.

Therefore, the adsorbent material having a specific gravity range is selected which provides sufficient suspension and therefore sufficient contact with the wastewater and its contaminants. In addition, in certain embodiments, the specific gravity range provides sufficient settling characteristics for subsequent removal of the adsorbent material from the wastewater. In further embodiments, selection of the specific gravity of the adsorbent material is based on minimization of the energy required to maintain the adsorbent material in suspension.

Furthermore, the desired adsorbent material, such as granular activated carbon, has a hardness level that minimizes creation of fines and other particulates due to inter-granule collisions and other process effects.

The size of the adsorbent material that the separation subsystem is designed to retain and thereby prevent its passage into the membrane operating system is optimized to minimize the amount of adsorbent material and fines entering the membrane operating system. Therefore, in embodiments in which the solids separation apparatus is a membrane operating system, abrasion and fouling caused by carbon granules or other granular materials impinging on the membranes is minimized, while still providing the operational advantages associated with the use of adsorbent materials including activated carbon.

Suitable granule sizes for the adsorbent material are selected to complement the selected screening/separation methods, and the needs of the particular wastewater being treated. In certain preferred embodiments, the bottom limit of effective granule size of the adsorbent material is selected so that it can easily be separated from the flow of mixed liquor entering the membrane operating system tank(s) in which the membranes are located. In general, the effective granule size of the adsorbent material has a bottom limit of about 0.3 millimeters, where greater than about 99.5 weight % of the adsorbent material is above the bottom limit; preferably having a lower limit of about 0.3 millimeters to an upper limit of about 2.4 millimeters (corresponding to a mesh size 50 to a mesh size 8, based on United States Standard Sieve Series), where greater than 99.5 weight % of the adsorbent material is within the lower and upper limit; and in certain preferred embodiments about 0.3 millimeters to about 1.4 millimeters (corresponding to a mesh size 50 to a mesh size 14, based on the United States Standard Sieve Series) where greater than about 99.5 weight % of the adsorbent material is within the lower and upper limit. It has been demonstrated that a granular activated carbon with a minimum effective granule size of about 0.5 millimeters to about 0.6 millimeters can be easily and efficiently screened from the mixed liquor with a suitable separation system, and such effective sizes, in granular activated carbon of suitable densities, also can economically be maintained in suspension.

The use of adsorbent material to adsorb the compounds entirely resistant to bio-decomposition, biologically inhibitory compounds, and/or biologically refractory compounds, or a combination of these, allows the process to handle a much higher flow rate of wastewater than conventional systems, as the organisms that are biologically decomposing the organic compounds would not be limited by the hydraulic residence time of conventional systems. The biologically inhibitory compounds and/or certain biologically refractory compounds remain on the adsorbent material for an extended period of time, and thus the micro-organisms have many times the hydraulic residence time to break them down. This allows a significantly smaller unit to treat the wastewater stream than would be required without the addition of adsorbent material.

The use of the low concentration wastewater treatment system of the present invention rather than a conventional system or a conventional system with addition of powdered activated carbon eliminates problems associated with settling of solids that would occur in a high flow rate conventional system that does not use a membrane for solids separation from the effluent.

The low concentration wastewater treatment system of the present invention can be modified to treat specific contaminants that might be present in any particular wastewater by using an adsorbent material that has been specially treated to selectively adsorb the particular contaminant of concern. For example, a granular activated carbon or other adsorbent material that has been specially treated to adsorb metals can be used for wastewaters that have high concentrations of metals. The dissolved metals can preferentially adsorb onto the treated granular activated carbon and then be removed from the effluent. A periodic replacement of the adsorbent material allows the metals to be removed from the system and maintain a desired level of adsorptive capacity.

The invention provides a low cost alternative to permanent installations of high cost activated carbon adsorption columns or any of a number of other tertiary treatment systems that are expensive to operate. In addition, the present invention provides a simpler, smaller footprint, lower operating cost wastewater treatment system that can be set up and operated in a very short period of time and if necessary, can be configured as a portable system/apparatus. It can be deployed for periods of upset conditions or during events when a wastewater treatment plant is required to treat wastes that it was not normally capable of treating.

The system and method of the present invention avoids the treatment of the entire effluent stream in an expensive tertiary treatment system. It adsorbs the contaminants from the low concentration wastewater and treats them in a high flux adsorbent material treatment system integrated with a low flux adsorbent material biological regeneration reactor.

Previously developed tertiary systems attempt to treat the effluent from existing wastewater treatment plants having low concentrations of contaminants with an expensive activated carbon adsorption system or some other expensive tertiary treatment system. In all of these, the entire wastewater stream is treated with the tertiary treatment method. The system and method of the present invention removes pollutants from the full wastewater stream by adsorption, and then treats the adsorbent material in a low flux biological regeneration system that is relatively inexpensive to operate.

The method and system of the present invention have been described above and in the attached drawings; however, modifications will be apparent to those of ordinary skill in the art and the scope of protection for the invention is to be defined by the claims that follow.

The invention claimed is:

1. A method for treating wastewater that contains solids, biological oxygen demand compounds and biologically refractory and/or bio-inhibitory compounds, the process comprising:

separating a majority of the solids and biological oxygen demand compounds from the wastewater feed using a primary separation process to provide a solids phase and a water phase including wastewater, the solids phase containing an initial level of pathogens;

irradiating the solids phase to reduce the level of pathogens;

mixing the wastewater comprising biologically refractory and/or bio-inhibitory compounds with adsorbent material in a mixing zone for a time sufficient for adsorption of biologically refractory and/or bio-inhibitory compounds from the wastewater onto the adsorbent material to produce a mixture of adsorbent-treated wastewater and adsorbent material having biologically refractory and/or bio-inhibitory compounds adsorbed thereon, wherein the adsorbent material is characterized by adsorptive capacity for adsorption of biologically refractory compounds and/or biologically inhibitory compounds, and capacity for microorganisms adhered to the adsorbent material, wherein the combined adsorbent material characteristics contribute to biological regeneration of the adsorbent material;

separating and removing a major portion of the adsorbent-treated wastewater from the mixture of adsorbent-treated wastewater and adsorbent material having biologically refractory and/or bio-inhibitory compounds adsorbed thereon;

passing the adsorbent material having biologically refractory and/or bio-inhibitory compounds adsorbed thereon and a minor portion of the adsorbent-treated wastewater to a biological regeneration reactor containing microorganisms;

retaining the adsorbent material having contaminants adsorbed thereon and the minor portion of the treated wastewater in suspension in the biological regeneration reactor for a period of time that is sufficient to allow the microorganisms in the biological regeneration reactor to biologically act on at least a portion of the biologically refractory and/or bio-inhibitory compounds on the adsorbent material to produce biologically regenerated adsorbent material and a biologically treated water effluent;

discharging the biologically treated water effluent from the biological regeneration reactor; and recycling biologically regenerated adsorbent material to the mixing zone.

2. The method of claim 1, wherein the adsorbent material is selected from the group consisting of granular activated carbon, granular iron-based compounds, granular manganese-based compounds, granular alumino-silicate composites, synthetic resins, and combinations including at least one of the foregoing adsorbent materials.

3. The method as in claim 1, wherein the adsorbent material comprises granular activated carbon.

4. The method as in claim 3, wherein the granular activated carbon is treated to provide affinity to predetermined chemical species, metals or other compounds found to be present in the influent wastewater.

5. The method as in claim 3, wherein the adsorbent material further includes one or more of additional adsorbent materials selected from the group consisting of granular iron-based compounds, granular manganese-based compounds, granular alumino-silicate composites and synthetic resins.

6. The method of claim 1, further comprising homogenizing the separated solids phase prior to the irradiation.

7. The method of claim 1, wherein the irradiating comprises exposing the solids to one or more of beta-ray, gamma-ray, x-ray or electron beam radiation.

8. The method of claim 1, wherein the step of separating the solids and biological oxygen demand compounds from the wastewater feed produces low concentration wastewater.

9. The method of claim 1, further comprising
removing solids from the biological regeneration reactor water effluent using a solids separation apparatus selected from the group consisting of a membrane operating system, a clarifier, a settler, and a combination including at least one of a membrane operating system, a clarifier, or a settler, and passing at least a portion of activated sludge from the solids separation apparatus to the biological regeneration reactor.

10. The method of claim 9, wherein the biological regeneration reactor water effluent is passed through a separation subsystem in the biological regeneration reactor or downstream of the biological regeneration reactor to introduce the biological regeneration reactor water effluent that is substantially free of adsorbent material to the solids separation apparatus.

11. The method of claim 10, wherein the adsorbent material has an effective granule size of at least about 0.3 millimeters.

12. The method of claim 10, wherein the adsorbent material has an effective granule size of at least about 0.5 millimeters.

13. The method of claim 1, further comprising shearing an accumulated biomass from the regenerated adsorbent material prior to recycling the regenerated adsorbent material to the mixing zone.

14. The method of claim 13, further comprising separating the accumulated biomass from the regenerated adsorbent material prior to recycling the regenerated adsorbent material to the mixing zone.

15. The method of claim 1, further comprising mixing the irradiated solids phase with a filler material to produce a soil, compost, or fertilizer product.

* * * * *